(12) United States Patent
Naicken et al.

(10) Patent No.: US 9,189,534 B2
(45) Date of Patent: *Nov. 17, 2015

(54) ONLINE REPAIR OF A REPLICATED TABLE

(75) Inventors: Rajesh G. Naicken, Olathe, KS (US);
Clarence M. Pruet, III, Flower Mound, TX (US); Konduru I. Rajakumar, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 468 days.

This patent is subject to a terminal disclaimer.

(21) Appl. No.: 13/230,381

(22) Filed: Sep. 12, 2011

(65) Prior Publication Data

US 2012/0005160 A1 Jan. 5, 2012

Related U.S. Application Data

(63) Continuation of application No. 11/060,924, filed on Feb. 18, 2005, now Pat. No. 8,037,056.

(51) Int. Cl.
*G06F 17/30* (2006.01)

(52) U.S. Cl.
CPC .... *G06F 17/30587* (2013.01); *G06F 17/30575* (2013.01)

(58) Field of Classification Search
USPC .......................................................... 707/711
See application file for complete search history.

(56) References Cited

U.S. PATENT DOCUMENTS

| | | | |
|---|---|---|---|
| 5,170,480 A | 12/1992 | Mohan et al. | |
| 5,381,545 A | 1/1995 | Baker et al. | |
| 5,675,727 A | 10/1997 | Watanabe | |
| 5,684,984 A | 11/1997 | Jones et al. | |
| 5,737,601 A | 4/1998 | Jain et al. | |
| 5,745,753 A | 4/1998 | Mosher, Jr. | |
| 5,781,912 A | 7/1998 | Demers et al. | |
| 5,799,306 A | 8/1998 | Sun et al. | |
| 5,806,075 A | 9/1998 | Jain et al. | |
| 5,884,327 A | 3/1999 | Cotner et al. | |
| 5,926,819 A | 7/1999 | Doo et al. | |
| 6,058,401 A | 5/2000 | Stamos et al. | |

(Continued)

FOREIGN PATENT DOCUMENTS

| | | |
|---|---|---|
| JP | 07210435 | 8/1995 |
| WO | 03044697 | 5/2003 |

OTHER PUBLICATIONS

Wittenburg, T.M. et al., An Adaptive Document Management System for Shared Multimedia Data, Proceedings of the International Conference on Multimedia Computing and Systems, 1994, pp. 245-254, IEEE, Piscataway, NJ, United States.

(Continued)

*Primary Examiner* — Tony Mahoudi
*Assistant Examiner* — Mohammad Rahman
(74) *Attorney, Agent, or Firm* — Patterson & Sheridan, LLP

(57) ABSTRACT

Techniques are provided for resynchronizing instances of a replicated table. In one embodiment, a database server is provided as a member of a plurality of communicatively coupled database servers. Each database server is configured to support a replicating mode of operation and a non-replicating mode of operation. The instances of the replicated table are resynchronized responsive to a user request, without stopping any of the plurality of database servers and without requiring any of the plurality of database servers to operate in the non-replicating mode of operation.

20 Claims, 25 Drawing Sheets

(56) References Cited

U.S. PATENT DOCUMENTS

| | | | |
|---|---|---|---|
| 6,061,769 A | 5/2000 | Kapulka et al. | |
| 6,119,130 A | 9/2000 | Nguyen et al. | |
| 6,122,630 A | 9/2000 | Strickler et al. | |
| 6,216,136 B1 | 4/2001 | Ronstrom | |
| 6,216,137 B1 | 4/2001 | Nguyen et al. | |
| 6,351,795 B1 | 2/2002 | Hagersten | |
| 6,363,387 B1 | 3/2002 | Ponnekanti et al. | |
| 6,377,959 B1 | 4/2002 | Carlson | |
| 6,408,163 B1 | 6/2002 | Fik | |
| 6,421,686 B1 | 7/2002 | Martin, Jr. | |
| 6,460,052 B1 | 10/2002 | Thomas et al. | |
| 6,507,880 B1 | 1/2003 | Arimilli et al. | |
| 6,510,421 B1 | 1/2003 | Ganesh et al. | |
| 6,529,917 B1 | 3/2003 | Zoltan | |
| 6,529,932 B1 | 3/2003 | Dadiomov et al. | |
| 6,532,479 B2 | 3/2003 | Souder et al. | |
| 6,553,442 B1 | 4/2003 | Arimilli et al. | |
| 6,584,477 B1 | 6/2003 | Mosher, Jr. | |
| 6,587,856 B1 | 7/2003 | Srinivasan et al. | |
| 6,615,223 B1 | 9/2003 | Shih et al. | |
| 6,668,260 B2 | 12/2003 | Zoltan | |
| 6,681,226 B2 | 1/2004 | Bretl et al. | |
| 6,721,765 B2 | 4/2004 | Ghosh et al. | |
| 6,732,122 B2 | 5/2004 | Zoltan | |
| 6,738,971 B2 | 5/2004 | Chandrasekaran et al. | |
| 6,748,374 B1 | 6/2004 | Madan et al. | |
| 6,877,016 B1 | 4/2005 | Hart et al. | |
| 6,915,287 B1 | 7/2005 | Felsted et al. | |
| 6,983,277 B2 | 1/2006 | Yamaguchi et al. | |
| 7,003,531 B2 | 2/2006 | Holenstein et al. | |
| 7,162,689 B2 | 1/2007 | Demers et al. | |
| 7,200,620 B2 | 4/2007 | Gupta | |
| 7,200,624 B2 | 4/2007 | He et al. | |
| 7,376,675 B2 | 5/2008 | Pruet, III | |
| 2001/0007103 A1 | 7/2001 | Breiter et al. | |
| 2002/0016793 A1 | 2/2002 | Keith, Jr. | |
| 2002/0078231 A1 | 6/2002 | Chang et al. | |
| 2002/0087586 A1 | 7/2002 | Yamagishi | |
| 2002/0091716 A1 | 7/2002 | Yokouchi | |
| 2002/0099728 A1 | 7/2002 | Lees et al. | |
| 2002/0169788 A1 | 11/2002 | Lee et al. | |
| 2002/0174142 A1 | 11/2002 | Demers et al. | |
| 2002/0198899 A1 | 12/2002 | Yamaguchi et al. | |
| 2003/0046342 A1 | 3/2003 | Felt et al. | |
| 2003/0149709 A1 | 8/2003 | Banks | |
| 2003/0154238 A1 | 8/2003 | Murphy et al. | |
| 2003/0158868 A1 | 8/2003 | Zoltan | |
| 2003/0182308 A1 | 9/2003 | Ernst et al. | |
| 2003/0208511 A1 | 11/2003 | Earl et al. | |
| 2003/0212789 A1 | 11/2003 | Hamel et al. | |
| 2003/0225760 A1 | 12/2003 | Ruuth et al. | |
| 2003/0236786 A1 | 12/2003 | Shi et al. | |
| 2004/0006563 A1 | 1/2004 | Zwiegincew et al. | |
| 2004/0025079 A1 | 2/2004 | Srinivasan et al. | |
| 2004/0030703 A1 | 2/2004 | Bourbonnais et al. | |
| 2004/0030739 A1* | 2/2004 | Yousefi'zadeh | 709/201 |
| 2004/0078379 A1 | 4/2004 | Hinshaw et al. | |
| 2004/0103342 A1 | 5/2004 | Moser et al. | |
| 2004/0133591 A1 | 7/2004 | Holenstein et al. | |
| 2004/0158588 A1 | 8/2004 | Pruet, III | |
| 2004/0205066 A1 | 10/2004 | Bhattacharjee et al. | |
| 2005/0021567 A1 | 1/2005 | Holenstein et al. | |
| 2005/0125423 A1 | 6/2005 | Chou et al. | |
| 2005/0165818 A1 | 7/2005 | Cole et al. | |
| 2005/0193024 A1 | 9/2005 | Beyer et al. | |
| 2005/0278394 A1 | 12/2005 | Oks et al. | |
| 2006/0031811 A1 | 2/2006 | Ernst et al. | |
| 2006/0047713 A1 | 3/2006 | Gornshtein et al. | |
| 2006/0190497 A1 | 8/2006 | Inturi et al. | |
| 2006/0190498 A1 | 8/2006 | Pruet, III | |
| 2006/0190503 A1 | 8/2006 | Naicken et al. | |
| 2006/0190504 A1 | 8/2006 | Pruet, III | |
| 2007/0226218 A1 | 9/2007 | Chatterjee et al. | |
| 2008/0059469 A1 | 3/2008 | Pruet | |
| 2008/0215586 A1 | 9/2008 | Pruet | |

OTHER PUBLICATIONS

Silva, J. et al., An Algorithm to compare OO-Conceptual Schemas, Proceedings of the International Conference on Software Maintenance, 2002, pp. 351-358, IEEE, Piscataway, NJ, United States.

De Nicola, Rocco et al., A Modal Logic for Mobile Agents, ACM Transactions on Computational Logic, Jan. 2004, pp. 79-128, vol. 5 Issue 1, ACM, New York, NY, United States.

Lerner, Barbara Staudt, A Model for Compound Type Changes Encountered in Schema Evolution, ACM Transactions on Database Systems, 2000, pp. 83-127, vol. 25, No. 1, ACM, New York, NY, United States.

Guan, Yu et al., Parallel Genetic Algorithms with Schema Migration, 26th Annual International Computer Software and Applications Conference, Aug. 2002, pp. 879-884, IEEE, Piscataway, NJ, United States.

Cuenca-Acuna, Francisco Matias et al., Autonomous Replication for High Availability in Unstructured P2P Systems, 22nd International Symposium on Reliable Distributed Systems, Oct. 2003, pp. 99-108, IEEE, Piscataway, NJ, United States.

Ghandeharizadeh, Shahram et al., Placement of Continuous Media in Wireless Peer-to-Peer Networks, IEEE Transactions on Multimedia, Apr. 2004, pp. 335-342, vol. 6, Issue 2, IEEE, Piscataway, NJ, United States.

Joshi, Rushikesh K. et al., ShadowObjects: A Programming Model for Service Replication in Distributed Object Systems, Journal of Parallel and Distributed Computing, Oct. 1999, pp. 1-12, vol. 59, Issue 1, Elsevier, Inc., Atlanta, GA, United States.

IBM, Technique for Replication Distributed Directory Information, IBM Technical Disclosure Bulletin, May 1991, pp. 1-6, Thomson Reuters, New York, NY, United States.

IBM, IBM Informix Dynamic Server Enterprise Replication Guide, IBM, Mar. 2003, Version 9.4, Part No. CT1T2NA, pp. i-ix, pp. 9-22, IBM, Armonk, NY, United States.

IBM, IBM Informix Dynamic Server Enterprise Replication Guide, IBM, Mar. 2003, Version 9.4, Part No. CT1T2NA, pp. i-ii, pp. Appendix A-1 to G-4, Index pp. 1-18, IBM, Armonk, NY, United States.

Informix Guide to SQL: Syntax, Chapter 1: SQL Statements, Informix Guide to SQL: Syntax, version 9.1, 1998, pp. 1-22, Informix Software, Inc., Armonk, NY, United States, <http://www-306.ibm.com/software/data/informix/pubs/library/datablade/dbdk/sqls/01alter.fm1.html>.

IBM, Type Modification on Object Oriented Database using Exception Handling, IBM Technical Disclosure Bulletin, Dec. 1993, pp. 1-2, Thomson Delphion, New York, NY, United States.

Delmolino, Dominic J., Strategies and Techniques for Using Oracle7 Replication: Part 1, Strategies and Techniques for Using Oracle7 Replication, May/Jun. 1995, pp. 1-11, Oracle Corporation, Redwood Shores, CA, United States.

Porto, Fabio A. M., et al., Persistent Object Synchronization with Active Relational Databases, Proceedings of the Technology of Object-Oriented Languages and Systems, 1999, p. 53-62, IEEE, Piscataway, NJ, United States.

Vijaykumar, T. N., et al., Transient-Fault Recovery Using Simultaneous Multithreading, Proceedings of the 29th annual international symposium on Computer architecture, May 2002, pp. 87-98, vol. 30, Issue 2, ACM, New York, NY, United States.

IBM, Referential Integrity Implementation Details and Advantages, IBM Technical Disclosure Bulletin, Mar. 1995, pp. 1-6, Thomson Delphion, New York, NY, United States.

Office Action History of U.S. Appl. No. 11/061,071, dates ranging Jun. 22, 2007-Jan. 14, 2008.

Office Action History of U.S. Appl. No. 12/102,702, dates ranging from Oct. 8, 2010-Mar. 30, 2011.

Office Action History of U.S. Appl. No. 11/061,072, dates ranging from May 16, 2007-May 17, 2011.

Office Action History of U.S. Appl. No. 11/060,986, dates ranging from Jun. 21, 2007-Aug. 25, 2011.

Office Action History of U.S. Appl. No. 11/469,257, dates ranging from Feb. 12, 2009-Sep. 25, 2009.

(56) References Cited

OTHER PUBLICATIONS

Office Action History of U.S. Appl. No. 11/016,228, dates ranging from Mar. 7, 2007-Oct. 19, 2009.

U.S. Appl. No. 11/016,228 entitled "Differential Management of Database Schema Changes", filed Dec. 17, 2004.

Office Action History of U.S. Appl. No. 11/062,072, dates ranging from Jun. 29, 2006-Oct. 8, 2009.

* cited by examiner

ONLINE REPAIR OF A REPLICATED TABLE

CROSS-REFERENCE TO RELATED APPLICATIONS

This application is a continuation of co-pending U.S. patent application Ser. No. 11/060,924, filed on Feb. 18, 2005, and which is incorporated herein by reference in its entirety.

BACKGROUND

1. Field

This invention relates to a database management system; and in particular, this invention relates to online repair of a replicated table.

2. Description of the Related Art

Database management systems allow large volumes of data to be stored and accessed efficiently and conveniently in a computer system. In a database management system, data is stored in database tables which organize the data into rows and columns. FIG. 1 depicts an exemplary database table 24 which has rows 26 and columns 28. To more quickly access the data in a database table, an index may be generated based on one or more specified columns of the database table. In relational database management systems, specified columns are used to associate tables with each other.

The database management system responds to user commands to store and access data. The commands are typically Structured Query Language (SQL) statements such as SELECT, INSERT, UPDATE and DELETE, to select, insert, update and delete, respectively, the data in the rows and columns. The SQL statements typically conform to a SQL standard as published by the American National Standards Institute (ANSI) or the International Standards Organization (ISO).

Departments within an enterprise may have their own database management systems, typically at different sites. An enterprise typically wants to share data among the departments throughout the enterprise. A technique called replication is used to share data among multiple database management systems.

A replication system manages multiple copies of data at one or more sites, which allows the data to be shared among multiple database management systems. Data may be replicated synchronously or asynchronously. In synchronous data replication, a two-phase commit technique is used. In a two-phase commit, a transaction is applied only if all interconnected distributed sites agree to accept the transaction. Typically all hardware components and networks in the replication system must be available at all times in synchronous replication.

Asynchronous data replication allows data to be replicated on a limited basis, and thus allows for system and network failures. In one type of asynchronous replication system, referred to as primary-target, all database changes originate at the primary database and are replicated to the target databases. In another type of replication system, referred to as update-anywhere, updates to each database are applied at all other databases of the replication system.

An insert, update or delete to the tables of a database is a transactional event. A transaction comprises one or more transactional events that are treated as a unit. A commit is another type of transactional event which indicates the end of a transaction and causes the database to be changed in accordance with any inserts, updates or deletes associated with the transaction.

In some database management systems, a log writer updates a log as transactional events occur. Each transactional event is associated with an entry or record in the log; and each entry in the log is associated with a value representing its log position.

When a replication system is used, a user typically specifies the types of transactional events which cause data to be replicated. In addition, the user typically specifies the data which will be replicated, such as certain columns or an entire row. In some embodiments, the log writer of the database management system marks certain transactional events for replication in accordance with the specified types of transactional events. The replication system reads the log, retrieves the marked transactional events, and transmits the transactional events to one or more specified target servers. The target server applies the transactional events to the replicated table(s) on the target server.

A replicated table may need to be repaired under certain circumstances. For example, a replicated table may need to be repaired if it was taken out of replication for some duration of time, if some of the rows of that table failed to be replicated due to errors, or if the table was newly added into the replication topology and a user wants to bring the table up-to-date. In some replication systems, replication is stopped to repair a table.

Various database management systems operate in a non-stop environment in which the client applications using the database management system cannot be shut down. However, stopping replication may stop the database management system and therefore the client applications. Thus, there is a need for a technique to repair a replicated table without causing downtime to the client applications in the replication environment. The technique should repair a replicated table without requiring replication to be stopped.

SUMMARY

Embodiments of the invention provide a computer-implemented method, computer program product, and system for performing an operation that includes providing a database server as a member of a plurality of communicatively coupled database servers, where each database server is configured to support a replicating mode of operation characterized by providing access to a respective instance of a replicated table while replicating any changes to the replicated table. Each database server is further configured to support a non-replicating mode of operation characterized by providing access to the respective instance of the replicated table without replicating any changes to the replicated table. The operation also includes, responsive to a request and while the plurality of database servers is operating in the replicating mode of operation and subsequent to the respective instances becoming desynchronized, resynchronizing the respective instance of the replicated table on the database server, without stopping any of the plurality of database servers and without requiring any of the plurality of database servers to operate in the non-replicating mode of operation.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

Figure 1:
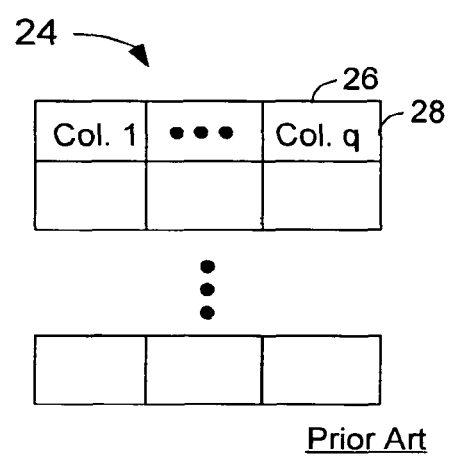
FIG. 1 depicts a block diagram of an illustrative table of a database management system.

After considering the following description, those skilled in the art will clearly realize that the teachings of the various embodiments of the present invention can be utilized to repair a replicated table. A method, system and article of manufacture are provided that repair a table. A replication environment has a first replicate comprising a source table on a source server and a target table on a target server. The source server transmits replication data from the source server with repair data from the source server to the target table in accordance with a commit order of the replication data and the repair data. The target server applies the repair data and the replication data to the target table based on the commit order.

A database server is a software application which implements a database management system. A replication server is a database server that participates in data replication. Multiple database servers can execute on the same physical server computer, and each database server can participate in replication. A database or replication server that participates in a replicate may also be referred to as a node.

In replication, changes to one or more tables of a database on a source replication server are collected, transported and applied to one or more corresponding tables on replication target servers. A replication application implements the replication server functionality.

To replicate data, a user defines a replicate, that is, the user provides a replicate definition. A replicate is associated with one or more replication servers, also referred to as participants, a table to replicate among the participants, and the columns of the table that will be replicated. The replicate is also associated with various attributes which describe how to replicate the data among the participants, such as conflict resolution rules.

The replication server maintains replication information in a replicate definition that comprises one or more tables in the global catalog. The replicate definition comprises information specifying the replicate configuration and environment, information specifying what data is to be replicated, for example, whether to replicate particular columns or an entire row, and information specifying the conditions under which the data should be replicated. The replicate definition also specifies various attributes of the replicate such as a description of how to handle any conflicts during replication. For example, the replicate definition comprises a replicate identifier, the name of the replicate, the table(s) of the replicate, the columns to replicate, the SQL select statement which created the replicate, and various flags.

Each replication server typically has its own local copy of the global catalog and maintains one or more tables in the global catalog to keep track of the replicate definition and state. The global catalog is created when a database server is defined as a replication server. The tables in a global catalog on one replication server are typically automatically replicated to the global catalogs of the other replication servers.

Figure 2:
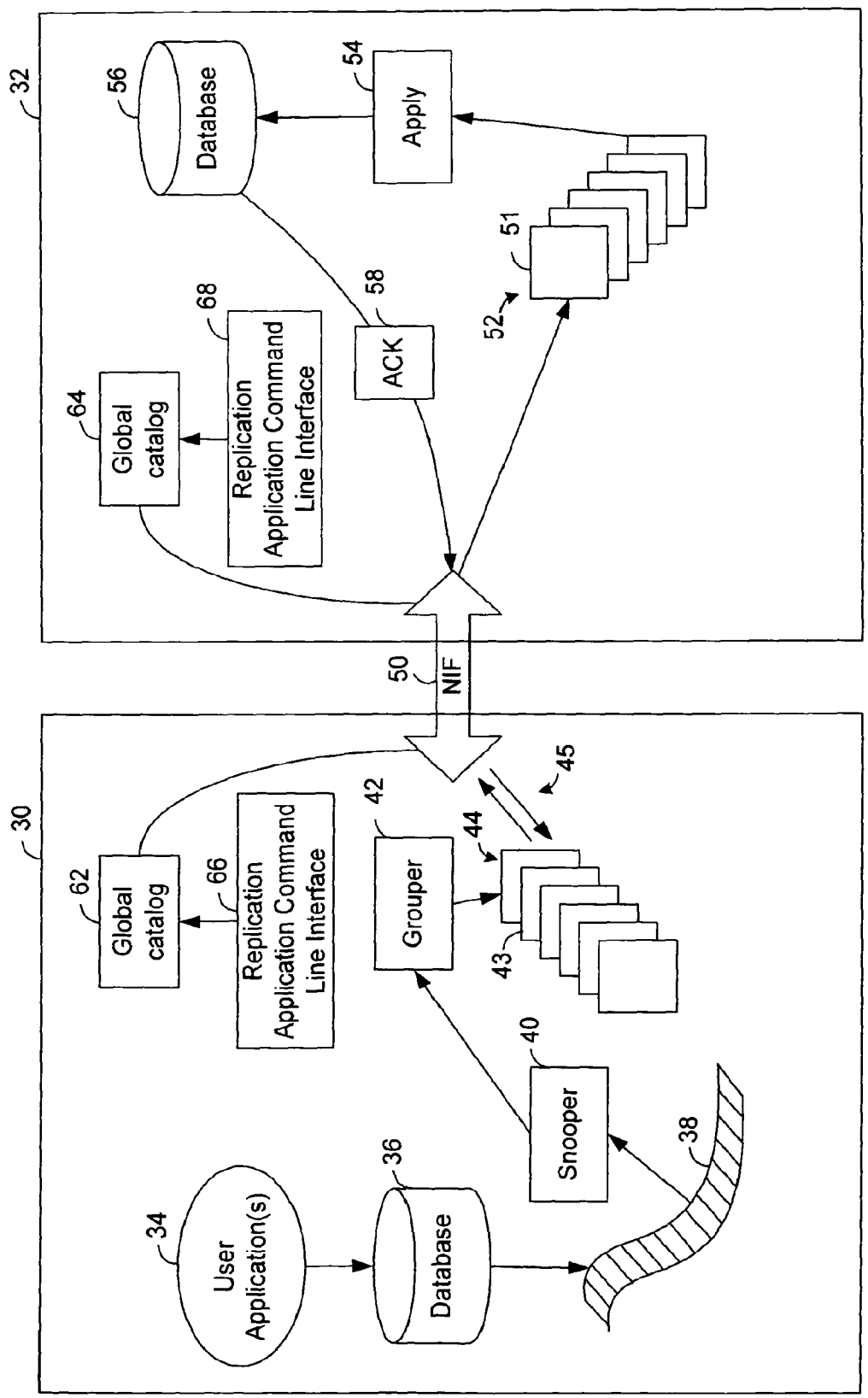
FIG. 2 depicts a diagram of an embodiment of replication servers suitable for use with the present invention.

FIG. 2 depicts a diagram of an embodiment of replication servers suitable for use with the present invention. A source replication server 30 and a target replication server 32 are participants, or nodes, in a replicate. The source replication server 30 and the target replication server 32 will be referred to as a source server and a target server. The source server 30 and the target server typically execute on different computer systems. In the source server 30, one or more user applications 34 are accessing and changing the tables of a database 36. The changes to the database 36 are stored in a log 38. The changes to the data are transactional events. The replication application comprises a snooper 40 and a grouper 42. The snooper 40 reads the log 38 and captures transactional events in accordance with the replicate definition. The grouper 42 assembles the captured transactional events in accordance with their associated transactions to provide transaction replication data 43 and places the transaction replication data 43 in a queue 44 to send to the target server 32 via the network interface (NIF) 50. In this description, the transaction replication data is also referred to as replication data or replicated data. As indicated by arrows 45, the queue 44 can be used to send and receive data. The queue 44 comprises a send queue to send data to the target server 32, and a receive queue to receive data from the target server 32.

In the target server 32, the transaction replication data 51 is received in a queue 52. An apply component 54 retrieves the transaction replication data 51 from the queue 52 and applies the replication data 51 to the appropriate table and column(s) in the database 56. For example, if the transaction replication data comprises an insert operation, the apply component performs the insert operation on the table of the replicate.

The source and target servers, 30 and 32, have global catalogs, 62 and 64, and a replication application command line interface, 66 and 68, respectively. The replication application command line interface 66 and 68 receives commands for the replication application, and executes those commands. The replication application command line interface 66 and 68 is also used to update the global catalogs 62 and 64, respectively.

In various embodiments, the replication application on a replication server typically comprises a snooper, a grouper and an apply component. In this way, data can be replicated both to and from the replication server.

In some embodiments, a computer system executing the replication application comprises multiple central processing units or processors, and various portions of the replication operation are executed concurrently. For example, the apply component may execute on one or more processors and each portion of the apply component that executes on one processor is referred to as an apply thread.

To repair a table, the repair job copies data from one or more rows from the repair source table to the repair target table. In some embodiments, the repair job determines whether the repair target table has extra rows relative to the repair source table; the repair job keeps, deletes or merges the extra rows in accordance with a specified option. An entire table, or alternately a portion of the table, can be repaired.

In various embodiments, the replication application provides one or more commands to repair a replicated table. The replication application provides a command in the command line interface which allows a user to define a repair job to repair a specified repair target table on a specified repair target server based on a repair source table on a specified repair source server. In some embodiments, because a replicate is associated with a single table on each participant of the replicate, the name of the table associated with the replicate name is retrieved from the global catalog based on the replicate name. Therefore, by specifying the replicate, the table is also specified.

A user, or alternately another application, can define, start, stop and delete a repair job on a single replicate or a replicate set. In some embodiments, a repair job is defined using a define repair command and then the repair job is started using a start repair command. The syntax of one exemplary define repair command is:

```
cdr define repair [ -c server ] jobname [ -e rule ] [ -b blocksize ]
    [ -r replname | -R replset ]
    -S source_server [ target_server | participants ]
```

The brackets indicate that an option may be omitted. The "-c server" option identifies the server on which the define repair command is executed. The "jobname" specifies the name of the repair job. The "-r repiname" option specifies the name of the replicate to repair in "repiname." A replicate set comprises a plurality of replicates. The "-R replset" option specifies the name of a replicate set to repair in "replset." The "-b" option specifies the block size, that is, the number of rows per repair block. Rows are sent to the target server in groups using repair blocks. The "-e rule" option specifies an extra rows option which contains the rule for handling any extra rows on the repair target table, the "rule" may be one of "delete," "merge" and "keep." The "-S server" option specifies the name of source server for the repair job. The repair job will use the table on the source server as the repair source table. The target_server specifies the name of the target server containing the table to be repaired, that is, the repair target table. In other embodiments, other syntaxes may be used to define a repair job.

In various embodiments, after a repair job is defined, the start repair command is used to run the repair job. The syntax of one exemplary start repair command is as follows:

cdr start repair [-c server] jobname

The "-c server" specifies the server on which the start repair command is executed. The "jobname" is the name of the repair job of the define repair command.

In another embodiment, a repair job, or alternately, the functionality of a repair job, is encapsulated as part of a start replicate command. The syntax of one exemplary start replicate command is as follows:

```
cdr start repl [-c server] [-S source_server ] [-e rule] replname
    [ target_server(s) ]
```

The "-c server" option specifies the server on which the start replicate command is executed. For the other options, the description of those options in define repair command also applies to the start replicate command.

Another exemplary start replicate command is as follows:
    cdr start replicate ReplicateName TargetServer--syncdatasource=SourceServer
In the start replicate command above, the replicate name (ReplicateName) and target server (TargetServer) are specified. The "- -syncdatasource=SourceServer" option specifies the source server for the repair job.

In yet another embodiment, the functionality of the define repair command and the start repair command is combined into a single command which defines and starts a repair job.

Various embodiments of a replication application have one or more properties in order to repair a table without suspending or stopping the client applications. The replication application sends data to repair the repair target table in the same conduit as the data from the on-going replication to avoid out-of-order issues in the repair target table. The conduit is an ordered path between a source and a target server which is used by the replication application. The replicated data and repair data flowing through the conduit is ordered. In some embodiments, the ordered path comprises at least a portion of the grouper, the queue and at least a portion of the apply component. The grouper places replicated and repair data into the queue based on the commit order of the associated transactions. The apply component receives data from the queue in the same order as the data was placed into the queue. The ordering is determined by the order in which the rows were committed on the source table on the source server. Commit operations on the repair data, in various embodiments, dummy updates, will be occurring concurrent to the user activity on the source server. Therefore the grouper places replication data as well as repair data in the same conduit in the commit order. However, the invention is not meant to be limited to an ordered path comprising at least a portion of the grouper, the queue and at least a portion of the apply component, other embodiments of providing an ordered path may be used.

The data to repair the repair target table is sent from the repair source server only to the repair target server and not to any other participants. Except for data replicated to the repair target table from participants other than the repair source server, the replication application performs normal replication on the repair target server. In some embodiments, while repairing the repair target table, any referential constraints that might exist on the repair target table are also considered. For instance, cascading deletes may be performed.

A replicate, also referred to as a primary replicate, is defined between the repair target table on the target server and the repair source table on the source server. The primary replicate may also include tables on other participants in addition to the repair source server and the repair target server.

In various embodiments, the repair job makes use of a shadow replicate. A shadow replicate is a replicate which is defined to be used in conjunction with another replicate, that is, the primary replicate. The shadow replicate can have one or more differences from the primary replicate. For instance, the shadow replicate may include different columns from the primary replicate, or may involve only a subset of the nodes, that is participants, used by the primary replicate. Also, the shadow replicate may have different conflict resolution rules from the primary replicate. The apply program of the replication target server, considers the shadow and primary replicates as equivalent, and applies replicated data for the primary and shadow replicates to the table as though the primary and shadow replicates were a single replicate. There may be more than one shadow replicate for a single primary replicate. Shadow replicates will be described in further detail below.

Generally during replication a source server transmits replicated data using the primary replicate. When repairing the repair target table, a shadow replicate is created and data to repair the repair target table is replicated from the repair source table to the repair target table using the shadow replicate. In various embodiments, for the purpose of repairing a table, the shadow replicate will have one source server, the repair source server, and one target server, the repair target server, as participants. Using the shadow replicate to replicate data between the repair source table and the repair target table prevents the repair data from being replicated to any other participants in the primary replicate.

Figure 3:
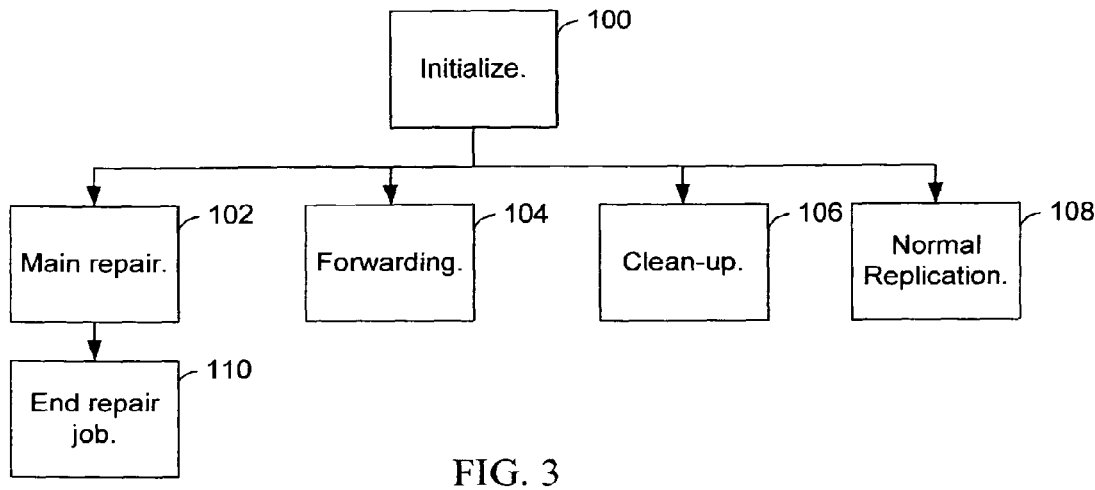
FIG. 3 depicts a high-level diagram illustrating an embodiment of various steps of repairing a replicated table.

FIG. 3 depicts a high-level diagram illustrating an embodiment of various steps of repairing a replicated table. In various embodiments, a repair job performs steps 100, 102, 104 and 110 of FIG. 3. In various embodiments, the diagram of FIG. 3 is implemented in a repair job. In step 100, initialization is performed. The operations of blocks or steps 102, 104, 106 and 108 are performed concurrently. In step 102, a main repair operation repairs a specified repair target table on a repair target server based on a specified repair source table on a repair source server.

In step 104, forwarding is performed. The target table is repaired while replication is on-going and replicated data for the repair target table from participants other than the repair source server is forwarded to the repair target server via the repair source server. In other words, the target server does not apply the replicated data for the repair target table that was received directly from the other participants. The source server receives the replicated data from the other participants, applies that replicated data to the repair source table and forwards that replicated data to the target server using the shadow replicate.

In step 106, a clean-up operation is performed as rows are repaired on the repair target table. In step 108, normal replication continues to be performed, except with respect to the repair target table on the repair target server. However, data from client applications at the source server which change the source table is replicated to the target server and other participants using the primary replicate. In step 110, the repair job ends and additional clean-up is performed to remove the replicates, tables, triggers and procedures which were created in the initialization step 100.

In various embodiments, a repair job is defined to repair a specified table. Defining the repair job involves the dynamic creation of various internal objects such as tables, stored procedures, replicates and triggers. These objects are created based on one or more of the following: details of the primary key for the table being repaired (obtained from the source and target databases) including number, type and order of key parts; the block size (specified in a "define repair" command); referential constraints on the table being repaired (obtained from the target database); an option that specifies how to handle the extra rows that are found on the target server but not on the source server (specified in the "define repair" command), and deleting the child rows recursively when a parent row is being deleted.

Figure 4:
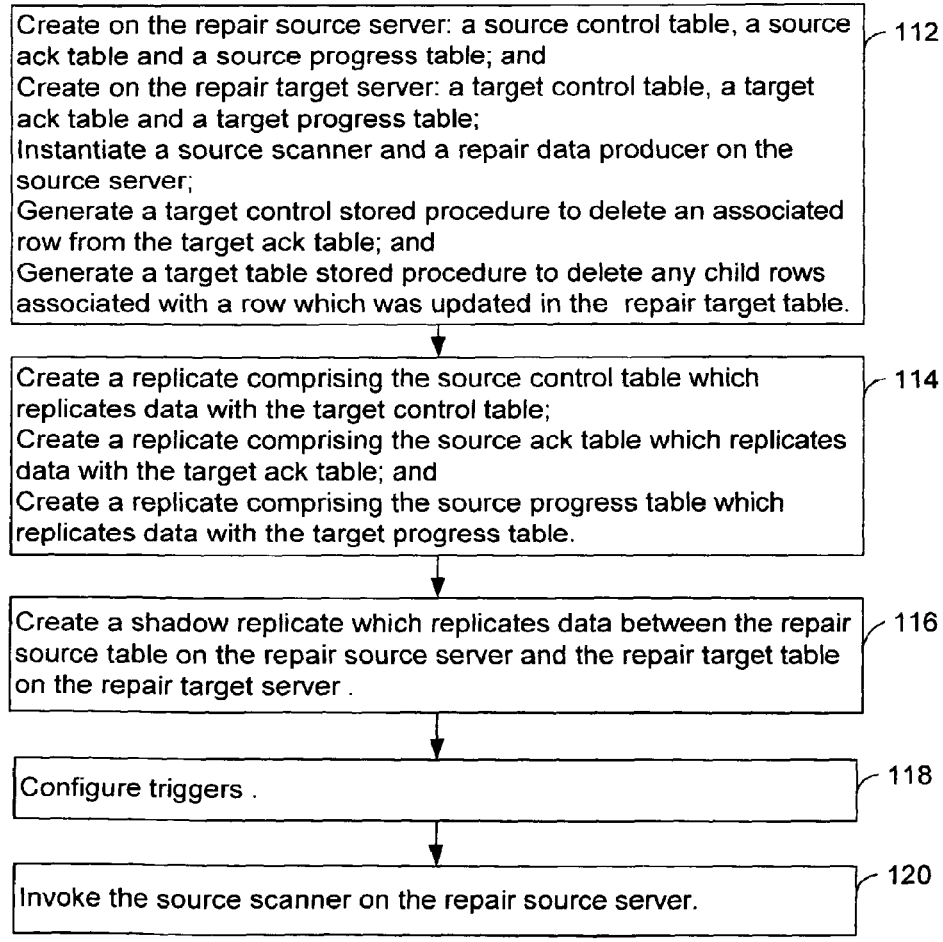
FIG. 4 depicts a flowchart of an embodiment of the initialization step of FIG. 3.

FIG. 4 depicts a flowchart of an embodiment of the initialization step 100 of FIG. 3. In step 112, on the repair source server, a source control table, a source ack table and a repair source progress table. On the repair target server, a target control table, a target ack table and a repair target progress table are created. These tables are referred to as coordination tables and are used to coordinate the repair operation between the repair source server and the repair target server. The source control table, and therefore, the target control table, is generated based on the primary key of the repair source table and the block size. The source ack table, and therefore the target ack table, is generated based on the block size. A source scanner and repair data producer are instantiated on the repair source server. The source scanner is instantiated based on the repair source table and the block size. A clean-up ack stored procedure is generated to delete a row from the target ack table. A target table stored procedure is generated to delete any child rows associated with a row which was updated in the repair target table.

In step 114, a replicate comprising the source control table which replicates data with the target control table is created. A replicate comprising the source ack table which replicates data with the target ack table is created. A replicate comprising the repair source progress table which replicates data with the repair target progress table is created. In step 116, a shadow replicate is created between the repair source server and the repair target server which replicates data between the repair source table and the repair target table.

In step 118, triggers are configured. The target analyzer is associated with an insert trigger on the target control table on the target server. The repair data producer is associated with an insert trigger on the source ack table on the source server.

The clean-up ack stored procedure is associated with a delete trigger on the target control table. In response to deleting a row from the target control table, the clean-up ack stored procedure deletes an associated row from the target ack table. The target table stored procedure is associated with a replication-only update trigger on the repair target table. Replication-only triggers are described in co-pending U.S. application Ser. No. 11/061,072 entitled "Replication-Only Triggers," filed concurrently herewith, by Clarence Madison Pruet III.

In step 120, a source scanner on the repair source server is invoked. The source scanner typically executes as a thread.

Table 1 below illustrates an exemplary source control table and target control table.

TABLE 1

Exemplary source control table and target control table.

| Block number | Block flags | Start primary key | End primary key | Primary key 1 | ... | Primary key n |
|---|---|---|---|---|---|---|

A row of the source control table corresponds to a block of rows of the repair source table. A block is based on a specified block size in the define repair command and contains one or more rows. A block number in the block number column is associated with a block of rows. The block flags in the block flags column are used to indicate whether the block of rows has been sent as repair data to the target, and whether the last block has been sent by the source scanner. The start and end primary key columns contains the low and high values, respectively, of the primary keys associated with the block of rows. One or more primary key columns, primary key 1 to primary key n, are generated based on the block size. In this example, a block has "n" rows.

Table 2 below illustrates an exemplary source ack table and target ack table.

TABLE 2

Exemplary source ack table and target ack table

| Block Number | Block Flags | Position 1 | ... | Position n |
|---|---|---|---|---|

A row of the source and target ack tables contains a request for repair data from the repair source table. The row specifies the block number associated with the repair data. The block number is used to reference a row containing the primary keys of the rows of the repair source table which are to be sent as repair data to the repair target table. In various embodiments, the block flags column has a default value of zero. A value of 1 in the block flags indicates that the block of rows associated with the block number has been processed and will be deleted. A value of 100 in the block flags column indicates that the row with that block number is the last row in the control table. The position columns corresponding to the primary key columns of the source control table and are used to request that a row be sent as repair data. A value of zero in a position column indicates that the target analyzer is not requesting a row, and a value of one in a position column indicates that the target analyzer is requesting a row.

Table 3 below illustrates an exemplary repair source progress table and repair target progress table.

TABLE 3

Exemplary repair source progress table and repair target progress table

| Node | Forwarded position | End position | Complete flag |
|---|---|---|---|

The node column contains the name of the participant. The forwarded position column contains a value associated with the current log position that has been forwarded from that participant via the repair source server. The end position column contains a value associated with a log position that represents a point of singularity at which the target server will switch to applying replicated data which was received directly from the participant server, rather than applying the forwarded replicated data from the repair source server. The complete flag column contains a complete flag which is set by the repair target server. In response to the complete flag being set, the source server stops forwarding replication data from the associated participant.

Figure 5:
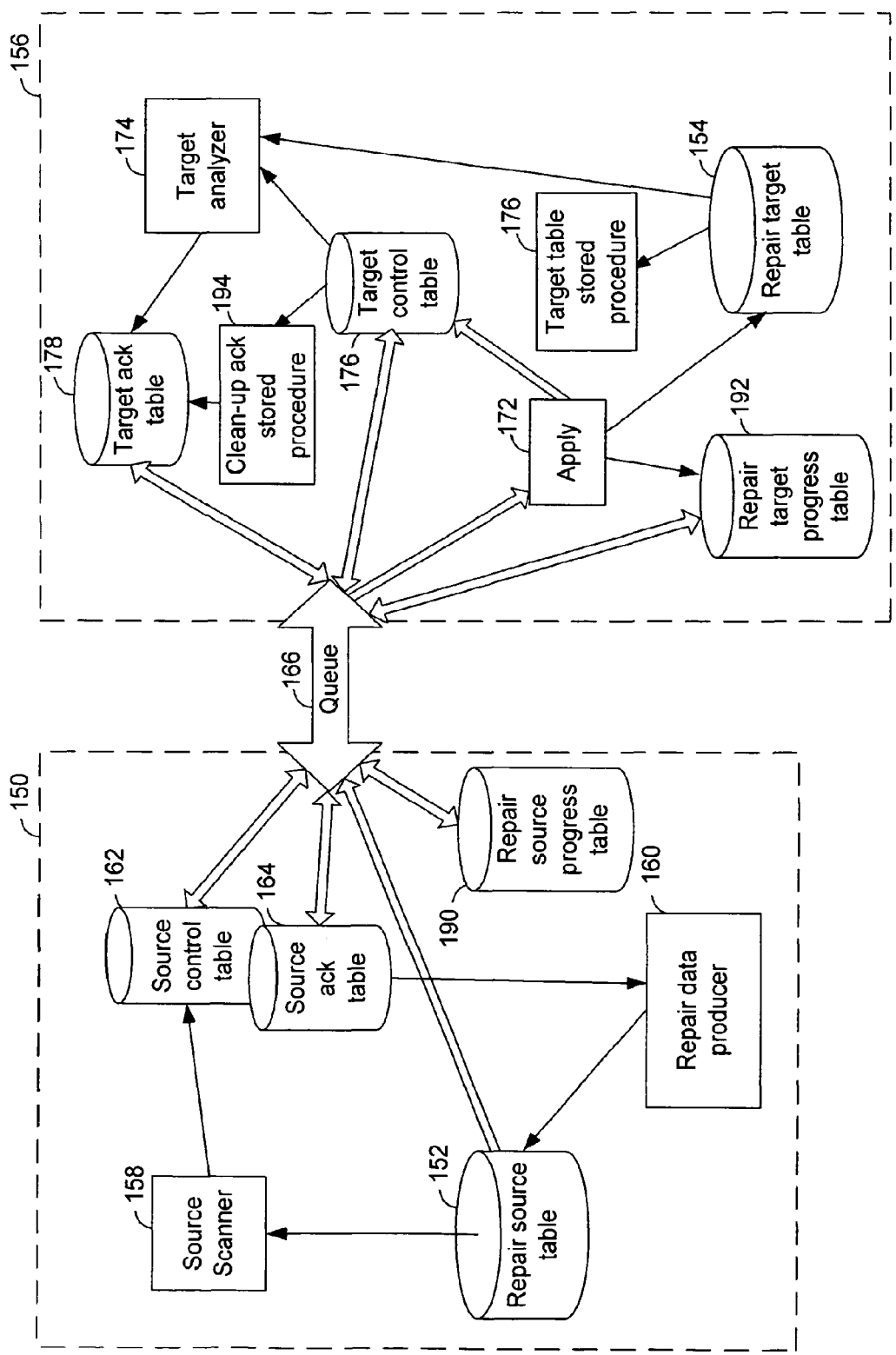
FIG. 5 depicts a block diagram of an embodiment illustrating various components of a repair job.

FIG. 5 depicts a block diagram of an embodiment of various components of a repair job. A source server 150 has a repair source table 152 and a repair target table 154 on the target server 156.

The source scanner 158 is a procedure which selects data from rows in the source repair table 152 to send to the target server 156 for comparison to the data in the repair target table 154 on the repair target server 156. In various embodiments, the source scanner 158 retrieves one or more rows from the repair source table 152 in accordance with the specified block size in the define repair command. A block contains one or more rows. An entire table, or a portion of a table, may be repaired. The source scanner 158 retrieves comparison data from rows starting from the beginning of the repair source table 152. In some embodiments, the comparison data comprises the primary keys for the rows. In alternate embodiments, the comparison data may also comprise data from one or more columns of the repair source table. Blocks of rows are sent sequentially starting from the beginning of the repair source table 152 until the end of the repair source table 152 is reached. Because a replicate may be a subset of the table, the repair job may repair a portion of the repair target table 154.

The source scanner 158 inserts the retrieved comparison data for the row from the source table, with other information, in a row of the source control table 162. The insert of the data into the source control table 162 is transported through the queue 166 as replicated data using the primary replicate to be applied to the target control table 176.

When data is replicated from the source control table 162, the apply component or thread 174 applies that data to the target control table 176. In response to applying the insert of data to the target control table 176, the insert trigger on the target control table is fired which invokes the target analyzer 174.

The target analyzer 174 determines the type of action to be taken based on the comparison data which was replicated to the target control table 176. The target analyzer 174 attempts to retrieve one or more rows from the repair target table 154 based on the start and end primary keys from the row which was inserted into the target control table 176. The target analyzer 174 determines whether there are any extra rows based on the starting and ending primary keys which were specified in the row in the target control table, and processes extra rows in accordance with an extra rows option which was set in the define repair command.

In some embodiments, to determine whether there are extra rows, one or more rows are retrieved based on a range of primary keys, that is, the start and end primary keys of the block. If multiple rows are returned based on the range of primary keys and one or more of the rows are associated with primary keys which are not in the comparison data in the target ack table, the target analyzer determines that there are extra rows. A block of rows from the repair source table is associated with a start primary key and an end primary key. For instance, if the block has primary keys of {1, 2, 4, 10}, the start value of the primary key is one and the end value of the primary key is ten. A range search is performed on the repair target table based on the primary keys of one and ten. If the repair target table returns rows having primary keys of {1, 2, 4, 9, 10}, the row associated with the primary key having a value of 9 is an extra row. The target analyzer handles extra rows in accordance with an extra rows option. The extra rows option may have a default setting, or may be specified by a user when defining the repair job. If the extra rows option indicates that extra rows are to be deleted, the target analyzer deletes all the extra rows except for one, generates a request to update the remaining row and inserts the request in the target ack table 178.

When deleting a row from the target table, the target analyzer 174 determines if any child rows in other tables are associated with the row being deleted and to delete those child rows. In other words, the target analyzer 174 performs cascading deletes.

If the extra rows option indicates that the extra rows are to be merged and if the replicate is defined as update anywhere, the target analyzer causes the extra rows to be propagated to the repair source table.

The target analyzer 174 generates a request for repair data for all the rows specified by the primary keys in the row of the target control table. The request comprises a block number, block flags set equal to zero and a value of one in the position column for all the requested rows in the block. The target analyzer 174 inserts the request into the target ack table 178. In some embodiments, all the position columns for the blocks contain a value of one, and therefore, all rows of are requested for repair.

The inserted row request in the target ack table 178 is replicated to the source ack table 164 on the source server 150 during normal replication.

In response to replication inserting the row request into the source ack table 164 on the source server 150, the insert trigger on the source ack table 164 is fired which invokes the repair data producer 160. To provide repair data, the repair data producer 160 performs a repair operation, typically executing a dummy update statement, to update the data in the requested rows of the repair source table 152 based on the block number and the primary key values in the source control table 162 which have a position value of one in the request in the source ack table 164. The repair data producer 160 also specifies that the shadow replicate be used, and issues the dummy update statements. For example, a dummy update statement, in SQL, to update a row in the repair source table is "update repair_source_table—a set col1=col1." This dummy update statement updates a column to itself and causes the current image of the row to be placed in the log. Therefore the update with the current row data is replicated to the repair target server using the shadow replicate. In this way, repair data is provided. The repair data producer also sets the block flags equal to one in the row of the source control table which contains the block number for which the repair data was provided.

On the target server, the apply component or thread 172 treats the shadow replicate and primary replicate as equivalents. The apply component or thread 172 receives the repair data, that is the update, for the row from the queue and applies the repair data to the repair target table. When a row is missing from the repair target table, the apply component or thread 172 converts the update to an insert to insert the row into the repair target table. When the apply performs an update to the repair target table, the replication-only update trigger on the repair target table is fired which invokes the target table stored procedure 176. The target table stored procedure determines if any child rows associated with the updated row in the repair target table should be deleted, and if so, deletes those child rows.

In addition, the clean-up 106 (FIG. 3) is performed. The repair data producer 160 also deletes any rows in the source control table 162 with block flags equal to one except for the row with the highest block number. The row with the highest block number can be used to restart the repair job. The delete is replicated to the target control table 176 using the replicate on the source and target control tables. In response to the delete being replicated to the target ack table, the delete trigger on the target control table is fired which invokes the clean-up ack stored procedure stored procedure 194 which deletes the associated row from the target ack table 178 based on the block number of the row which was deleted from the target control table. The delete from the target ack table 178 is replicated to the source ack table 164 using the replicate on the source and target ack tables. Thus the row is deleted from the source and target control tables, 162 and 176, respectively, and from the source and target ack tables, 164 and 178, respectively.

Figure 6:
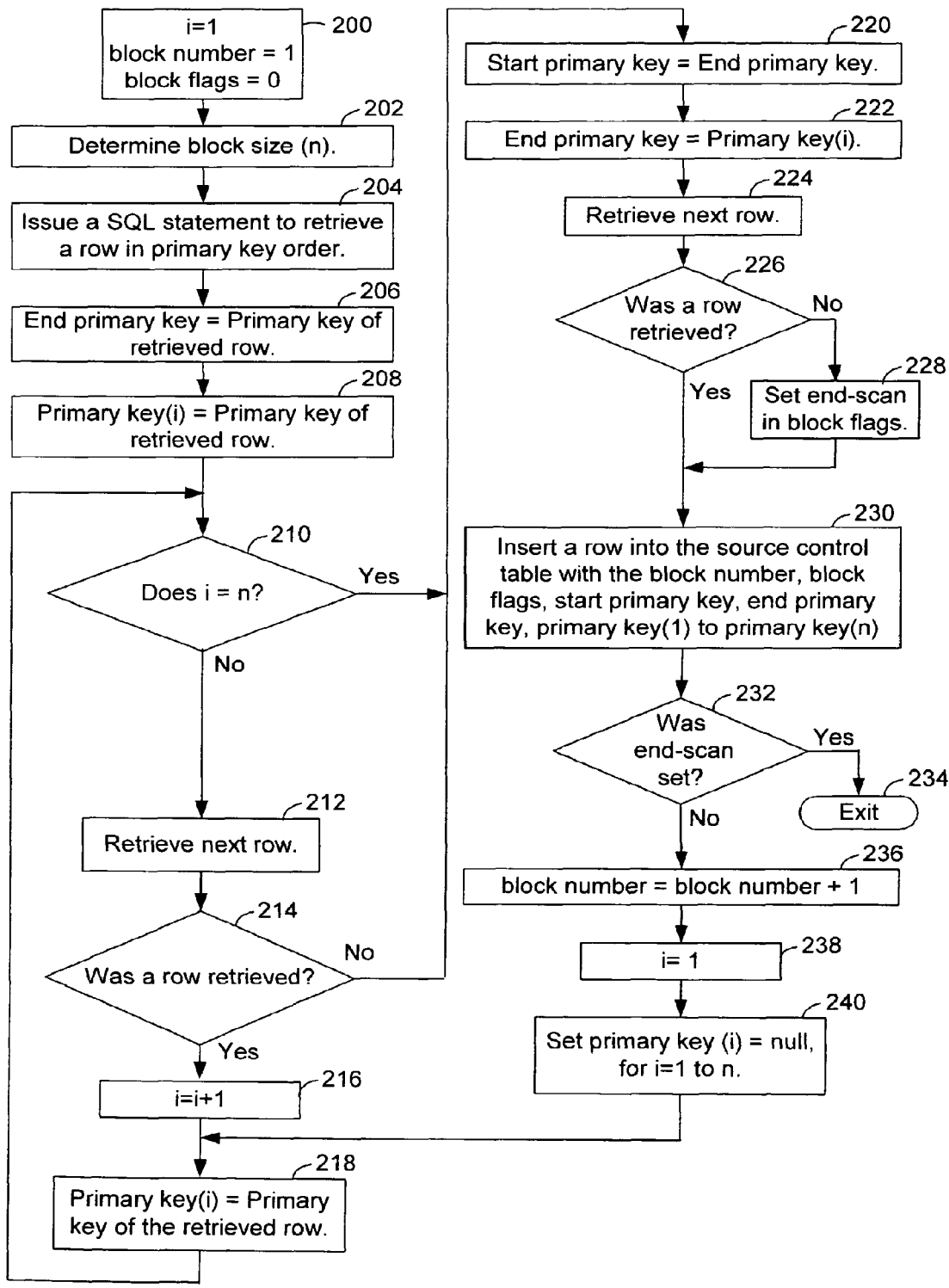
FIG. 6 depicts a flowchart of an embodiment of the source scanner of FIG. 5.

FIG. 6 depicts a flowchart of an embodiment of the source scanner 158 of FIG. 5. In step 200, the source scanner sets a block position counter (i) equal to one, a block number equal to one, and block flags equal to zero. In step 202, the block size (n) is determined. The block size may be a default predetermined value or specified in the define repair command. In step 204, the source scanner issues a SQL statement to retrieve a row in primary key order. In step 206, the source scanner sets the value of end primary key equal to the primary key of the retrieved row. In step 208, the source scanner sets primary key(i) equal to the primary key of the retrieved row.

Step 210 determines whether the value of i is equal to n, that is, whether a block of rows has been retrieved. If not, in step 212, the source scanner retrieves the next row. In step 214, the source scanner determines whether a row was retrieved. If so, in step 216, the value of i is incremented by one, and in step 218, primary key(i) is set equal to the primary key of the retrieved row. Step 218 proceeds to step 210.

If step 210 determines that the value of i is equal to n, a block of rows has been retrieved. In step 200, start primary key is set equal to end primary key, that is, the end primary key of the previous block. In step 222, end primary key is set equal to primary key(i). In step 224, the source scanner attempts to retrieve the next row. Step 226 determines whether a row was retrieved. If not, in step 228, end-scan is set in the block flags, and step 228 proceeds to step 230. If step 226 determines that a row was retrieved, step 226 proceeds to step 230.

In step 230, the source scanner inserts a row into the source control table with the block number, block flags, start primary key, end primary key, and primary key(1) to primary key(n). Step 232 determines whether end-scan was set. If so, in step 234, the source scanner exits.

If step 232 determines that end-scan was not set, in step 236, the block number is incremented by one. In step 238, the value of i is set equal to one. In step 240, the values of primary key(i) is set equal to null for i=1 to n. Step 240 proceeds to step 218 to process the retrieved row.

For example, a repair source table T1 is shown below. The table has a primary key in column one and data in column two.

TABLE 4

Exemplary Repair Source Table T1

| Primary Key (column 1) | Column 2 |
|---|---|
| Pkey1 | "abc" |
| Pkey2 | "efgh" |
| Pkey3 | "xxxx" |
| Pkey4 | "fdfdfd" |
| Pkey5 | "rererer" |
| Pkey6 | "tttt" |
| Pkey7 | "eeee" |

The rows of an exemplary source control table associated with the repair source table above are shown below in Table 5. For block number two, the value of "100" in block flags represents end-scan. The block size of the exemplary source control table is equal to five.

TABLE 5

Exemplary Source Control Table

| Block number | Block Flags | Start Primary Key | End Primary Key | Primary key 1 | Primary key 2 | Primary key 3 | Primary key 4 | Primary key 5 |
|---|---|---|---|---|---|---|---|---|
| 1 | 0 | Pkey1 | Pkey5 | Pkey1 | Pkey2 | Pkey3 | Pkey4 | Pkey5 |
| 2 | 100 | Pkey5 | Pkey7 | Pkey6 | Pkey5 | | | |

The rows that are inserted into the source control table are replicated to the target control table. In response to inserting a row into the target control table, the target analyzer trigger is fired which invokes the target analyzer.

Figures 7, 7A:
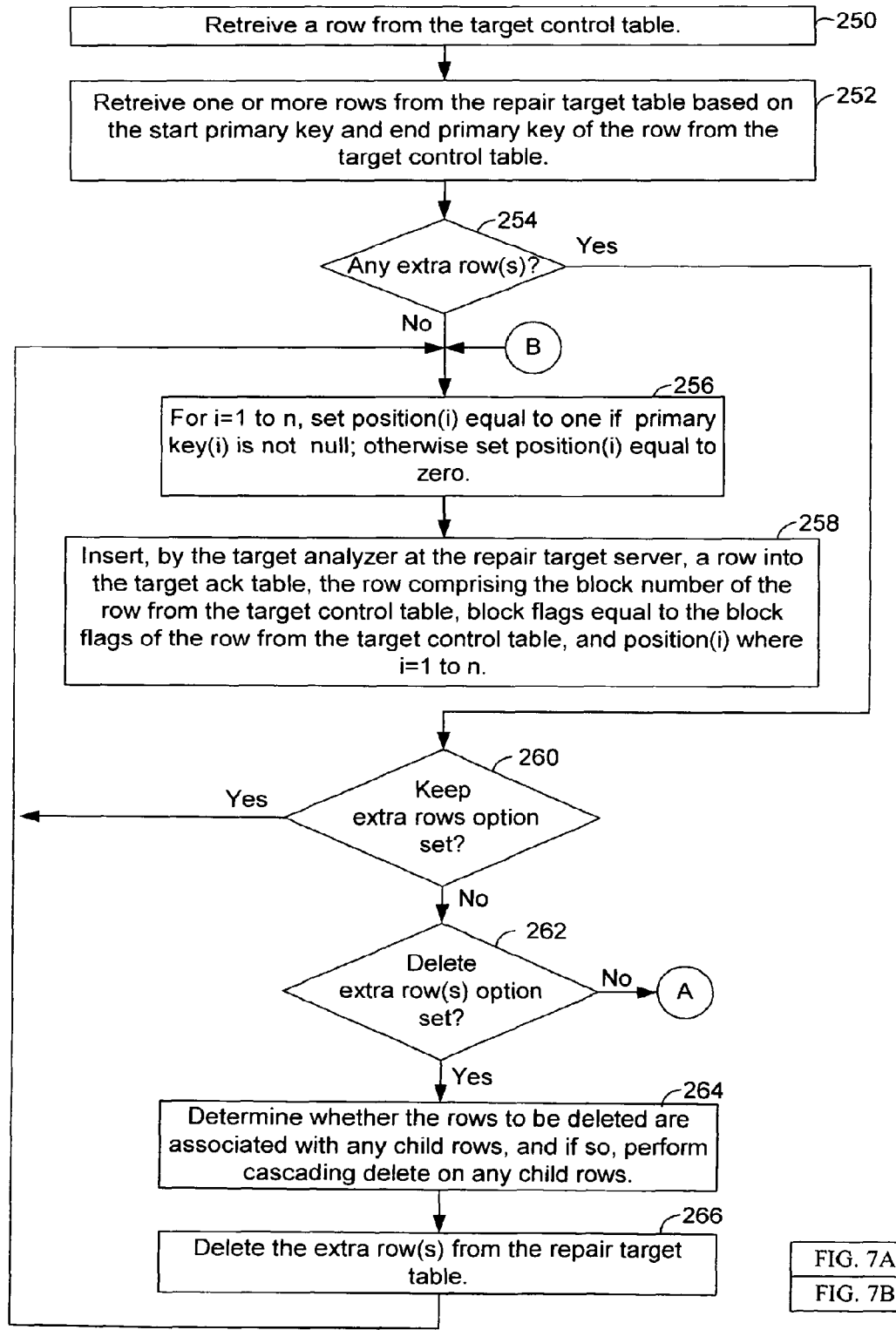
FIG. 7 comprises FIGS. 7A and 7B which collectively depict a flowchart of an embodiment of the target analyzer of FIG. 5.
Figure 7B:
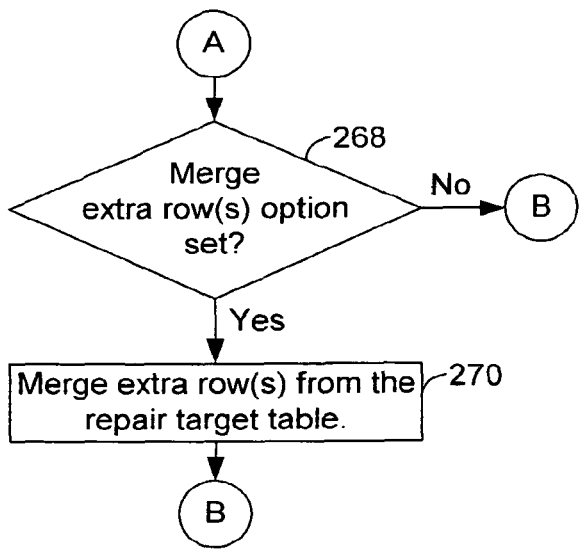

FIG. 7 comprises FIGS. 7A and 7B which collectively depict a flowchart of an embodiment of the target analyzer 174 of FIG. 5. In FIG. 7A, in step 250, the target analyzer retrieves a row from the target control table 176 (FIG. 5). In step 252, the target analyzer retrieves one or more rows from the repair target table based on the start primary key and end primary key of the row from the target control table. Step 254 determines whether there are any extra rows. If not, in step 256, for values of i equal to 1 to n, where n is the block size, the target analyzer sets position(i) equal to one if the primary key(i) is not null, and otherwise sets position(i) equal to zero. In step 258, the target analyzer at the repair target server inserts a row into the target ack table. The row is a request for repair data. The row comprises the block number of the row from the target control table, block flags equal to the block flags of the row from the target control table, and the values of position(i) where i=1 to n.

In response to step 254 determining that there are extra rows, the target analyzer processes extra rows in accordance with the extra rows option that was specified when the repair job was defined, or using a default extra rows option. Step 260 determines whether the keep extra rows option is set. If so, step 260 proceeds to step 256 to update the rows which are not extra. If step 260 determines that the keep extra rows option is not set, step 262 determines whether the delete extra rows option was set. If so, in step 264, the target analyzer determines whether the row(s) to be deleted are associated with any child rows, and if so, performs a cascading delete on the child rows. In step 266, the target analyzer deletes the extra rows from the target repair table. Step 266 proceeds to step 256.

If step 262 determines that the delete extra rows option is not set, step 262 proceeds via Continuator A to step 268 of FIG. 7B. Step 268 determines whether the merge extra rows option is set. If step 268 determines that the merge extra rows option is set, in step 270, the extra rows from the target repair table are merged, that is, the extra rows are propagated to the repair source table. Step 270 proceeds via Continuator B to step 256 of FIG. 7A. If step 268 determines that the merge extra rows option is not set, step 268 proceeds via Continuator B to step 256 of FIG. 7A.

In response to inserting the row into the target ack table, that row is replicated to the source ack table 164 (FIG. 5). In response to replication inserting the row into the source ack table 164 (FIG. 5), the insert trigger on the source ack table is fired which invokes the repair data producer 160 (FIG. 5).

Table 6 shown below illustrates an exemplary source ack table which corresponds to block number one of the exemplary source control table of FIG. 5. In the source ack table, each position has a value of one which means that at least one replicated column of each row of block number one is requested to be sent as repair data.

TABLE 6

Exemplary source ack table

| Block Number | Block Flags | Position 1 | Position 2 | Position 3 | Position 4 | Position 5 |
|---|---|---|---|---|---|---|
| 1 | 0 | 1 | 1 | 1 | 1 | 1 |

The apply component will have issued a start transaction prior to invoking the repair data producer, and the execution of the repair data producer is associated with that transaction.

Figure 8:
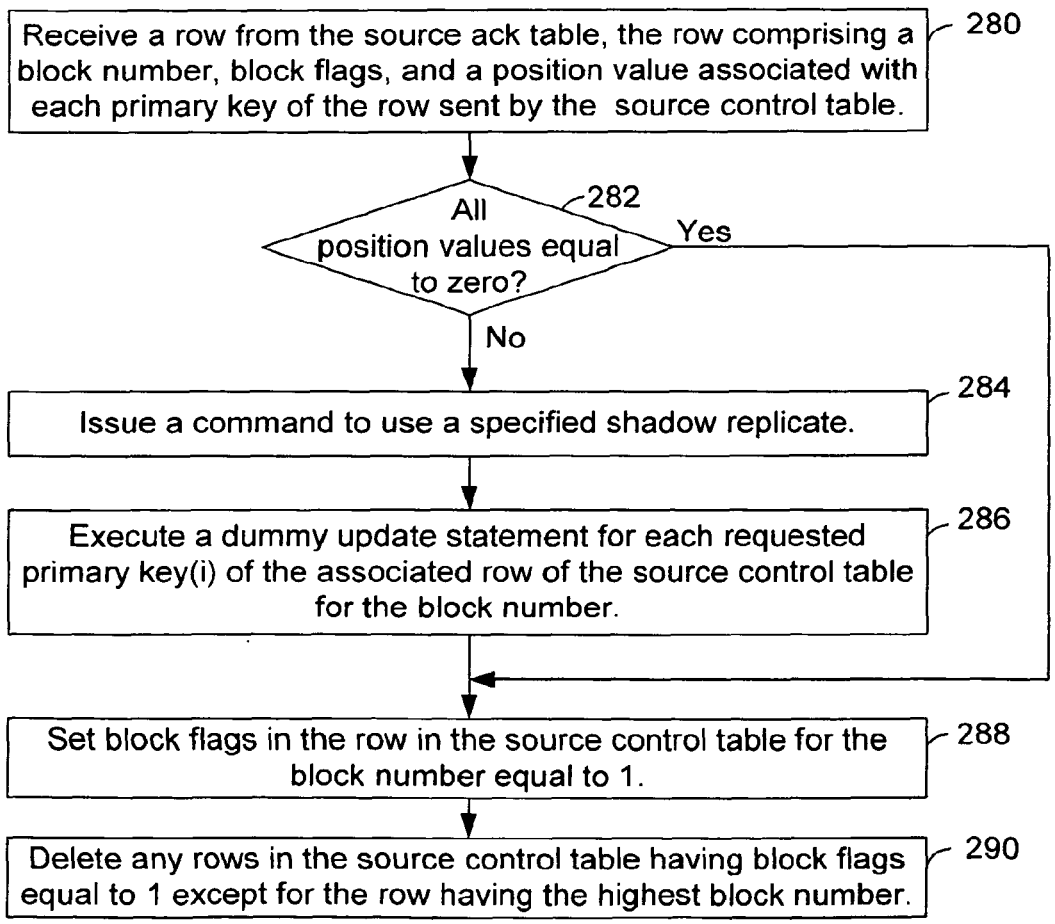
FIG. 8 depicts a flowchart of an embodiment of the repair data producer of FIG. 5.

FIG. 8 depicts a flowchart of an embodiment of the repair data producer 160 of FIG. 5. In step 280, the repair data producer receives a row from the source ack table. The row comprises the block number, block flags and the position value associated with each primary key in the row sent by the source control table.

Step 282 determines whether all position values are set equal to zero. If not, in step 284, the repair data producer issues a command to use a specified shadow replicate. The specified shadow replicate is the shadow replicate that was created or identified in the initialization of the repair job. In step 286, the repair data producer executes a dummy update statement for each requested primary key(i) of the associated row of the source control table for the block number. In various embodiments, the dummy update statement is formatted during initialization and the repair data producer changes a "where" clause associated with the dummy update statement based on the parameters which were passed to the repair data producer. For example, in some embodiments, the dummy update statement is a SQL statement and if position 1 in the row from the source ack table has a value of one, the value of primary key 1 will be retrieved from the source control table for the block number, and that primary key will be used in the dummy update statement.

In another example, if position two of the row from the source ack table has a value of zero, then no dummy SQL statement will be executed. In this way, the repair data producer pushes the repair data as a transaction to the repair target server.

In step 288, the block flags in the row in the source control table for the block number are set equal to one. In step 290, the repair data producer deletes any rows in the source control table having block flags equal to one, except for the row having the highest block number. If step 282 determines that all position values are equal to one, step 282 proceeds to step 288.

Because the apply component or thread on the repair source server invoked the repair data producer, the apply component will issue a commit after the apply component or thread processes the last row of the replicated transaction.

The apply component or thread on the repair target server receives the replicated update on the shadow replicate and inserts or updates the data in the repair target table.

In various embodiments, in response to updating a row in the repair target table, the replication application performs cascading deletes. In response to an update of a row in the repair target table by the apply, the replication-only update trigger on the repair target table is fired and the target table stored procedure is invoked. The target table stored procedure determines whether any child rows in other tables which are associated with the updated row in the repair target table should be deleted and, if so, recursively deletes the child rows.

In some embodiments, a post-commit replication-only failure trigger is used to keep track of "repair rows," that is, rows that failed to be applied on the target server. A stored procedure associated with the post-commit replication-only failure trigger posts the key and an error code associated with any rows which failed to be applied to a violation table.

As indicated by step 104 of FIG. 3, while a repair target table is being repaired, the repair source server and the repair target server receive replicated data from the other participants for the repair source and target tables, respectively, on the primary replicate. The repair target server does not apply the replicated data from the other participants for the target table. The repair source server forwards the replicated data from the other participants for the repair source table to the repair target server using the shadow replicate. The flow of normal replicated data from the repair source server to the repair target server is not interrupted. While the repair target table is being repaired, the repair target server skips the application of replicated data for the repair target table that is directly received from the other participants. In some embodiments, the replicated data for the repair target table which is directly received from the other participants is stored, that is, spooled, on the repair target server to be examined after the repair target table on the repair target server is repaired. By forwarding the replicated data from the other participants via the repair source server to the repair target server, the replicated transactions and operations of the replicated data on the repair target table occur in the same order as on the repair source server.

Once the repair target table has been repaired, the repair job restores normal replication for each of the participants with the target server in the replicate. Normal replication refers to directly applying the replicated data from a participant to the repair target table, rather than skipping and applying that data when forwarded. Typically, normal replication with the target server is restored gradually among the participants.

Figure 9:
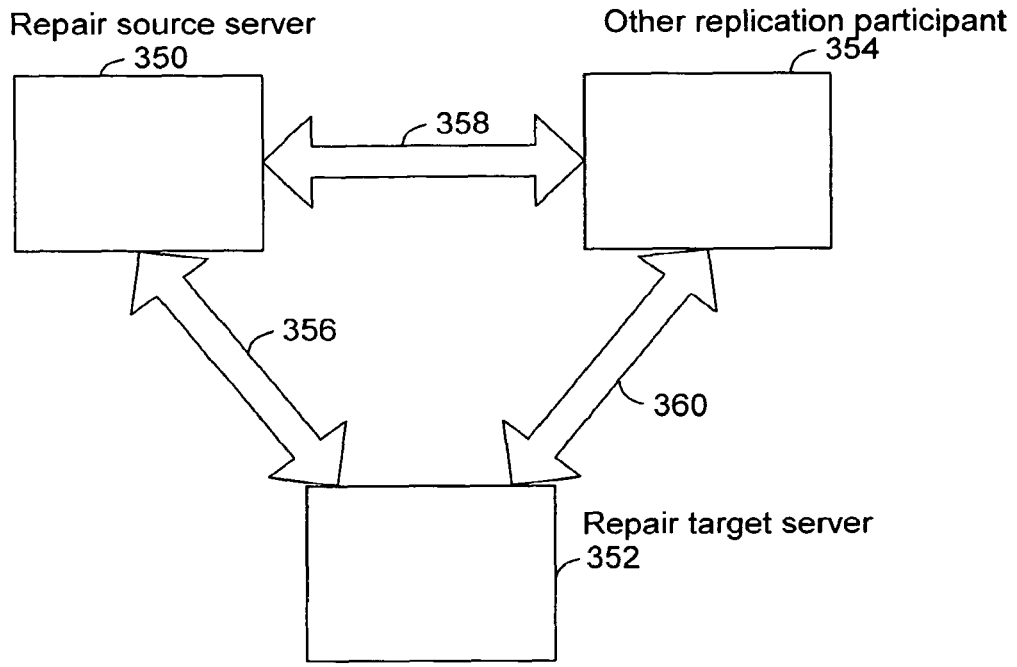
FIG. 9 depicts a block diagram of an exemplary replicate having a repair source server, a repair target server and another replication participant.

FIG. 9 depicts a block diagram of an exemplary replicate having a repair source server 350, a repair target server 352 and another replication participant 354. In this diagram, no repair job is being performed. As indicated by arrows 356, 358 and 360, replicated data is flowing between the repair source and the repair target, the repair source and the other replication participant, and the other replication participant and the repair target, respectively.

Figure 10:
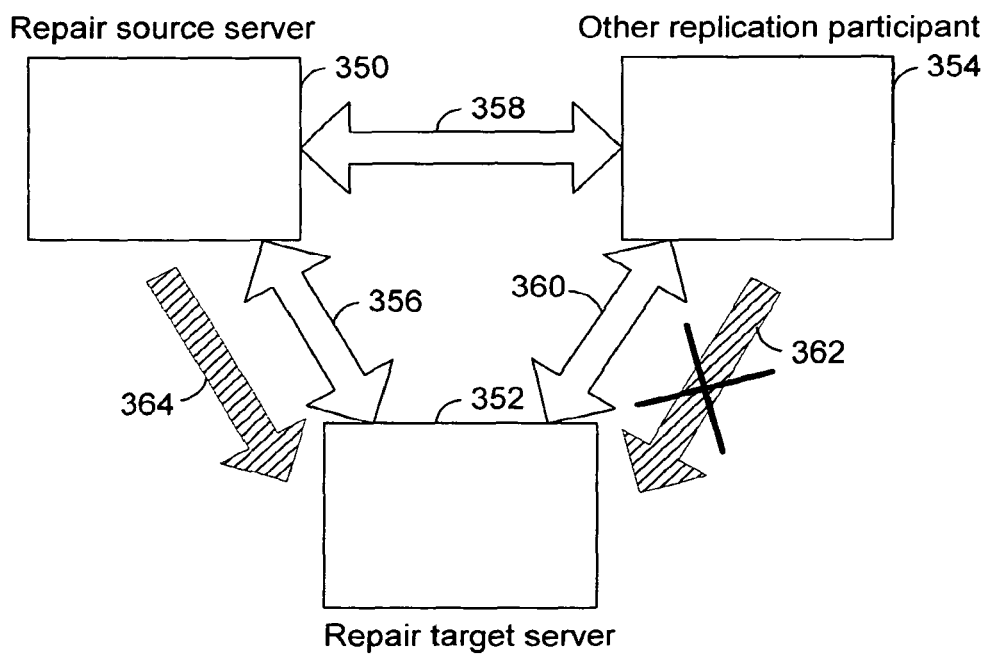
FIG. 10 depicts a block diagram of an embodiment of the exemplary replicate of FIG. 9 while the table is being repaired on the repair target server.

FIG. 10 depicts a block diagram of an embodiment of the exemplary replicate of FIG. 9 while the table is being repaired on the repair target server 352. As indicated by crossed arrow 362, replicated data from the other replication participant 354 which is directly received from that participant at the repair target server 352 is not applied by the repair target server 352. In other words, the repair target server skips over the replicated data for the target table which comes from servers other than the source server. The replicated data which is received directly from the other participant and skipped, is saved, that is spooled, on the target server for possible use after the repair target table on the repair target server 352 has been repaired.

As indicated by arrow 364, during the repair job, replicated data for the repair target table from the other replication participant 354 is forwarded to the repair target server via the source server. In this example, the replicated data from the other participant 354 which is directed to the repair table on the repair target server 352 is forwarded from the repair source server 350 to the repair target server 352 using the shadow replicate. The repair target server 352 applies the forwarded replicated data to the repair target table.

Replicated data from the other participant 354 which is directed to tables other than the repair target 352 continues to be applied directly by the repair target server 352.

A tree is a data structure that contains database servers that are linked in a hierarchical manner. The topmost database server is called the root. The root can have zero or more child database servers. The root server is the parent database server to its children and is the uppermost level in a hierarchically organized set of information. A non-root server is not a root database and has a complete global catalog and is connected to its parents and its children.

In some embodiments, a leaf server is a database server that has a limited catalog and no children. In these embodiments, leaf replication servers also have a limited catalog, and because the parent database server manages operations that involve only a leaf database server, the catalog of the leaf database server contains only enough data to allow it to interact with its parent server.

Figure 11:
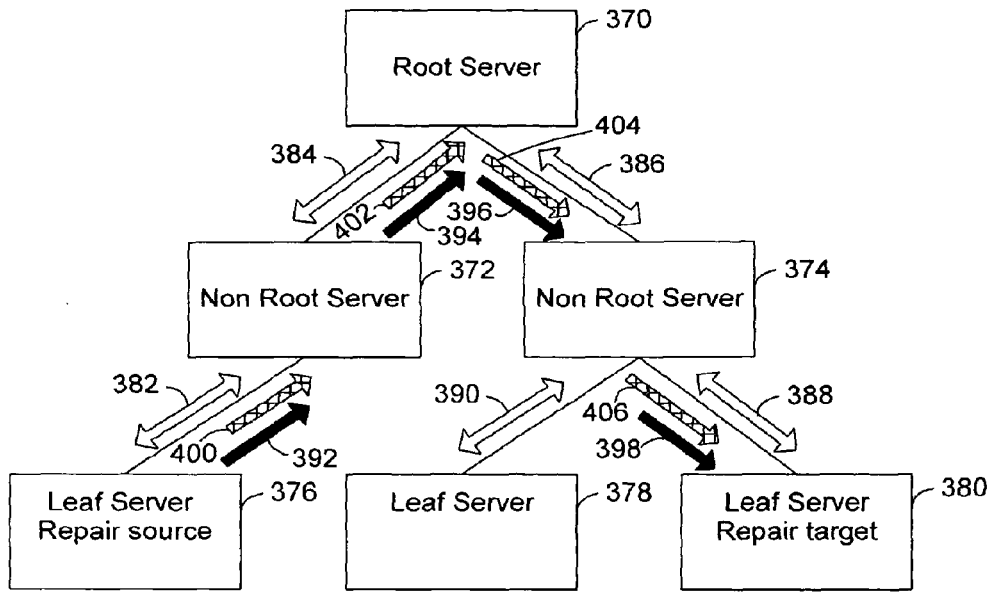
FIG. 11 depicts the flow of forwarded and repair data in an exemplary replication network having a tree structure.

FIG. 11 depicts the flow of forwarded and repair data in an exemplary replication network having a tree structure. The replication network is a hierarchy having a root server 370, non-root servers 372 and 374 and leaf servers 376, 378 and 380. Arrows 382, 384, 386, 388 and 390 represent the flow of replicated data that is not associated with a table that is being repaired. Leaf server 376 is the repair source and leaf server 380 is the repair target. The flow of repair data from the repair source 376 to the repair target 380 is represented by black arrows 392, 394, 396 and 398. The flow of forwarded data from the repair source 376 to the repair target 380 is represented by cross-hatched arrows 400, 402, 404 and 406.

Typically, when the apply component or thread performs a data manipulation language operation, that data manipulation language operation, a transactional event, causes a log record to be written. The apply component or thread flags the log record to indicate that the apply component or thread of the replication application performed the operation by setting an applied-data flag. In this way, when the snooper reads the log record, the snooper detects that the applied-data flag is set and does not replicate that log record.

Figure 12:
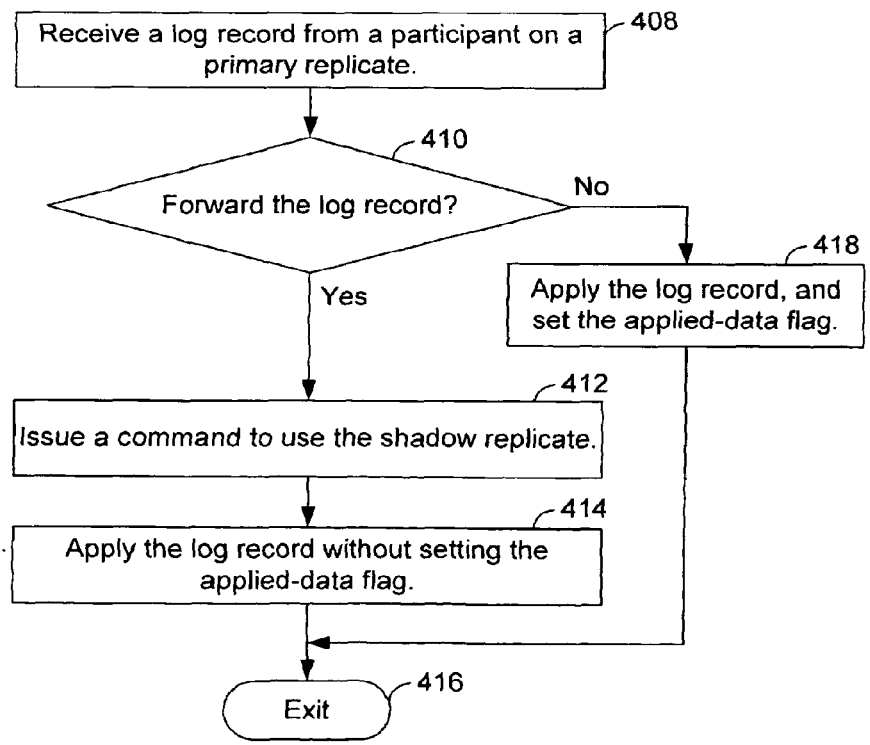
FIG. 12 depicts a flowchart of a portion of the apply component which forwards replicated data to the target server.

FIG. 12 depicts a flowchart of an embodiment of a portion of the apply component or thread which forwards replicated data to the target table on the target server. In step 408, a log record from a participant is received on a primary replicate. The primary replicate has a primary replicate identifier.

In step 410, the apply component or thread determines whether the log record is to be forwarded. The apply component or thread accesses a replicate definition table based on the primary replicate identifier and the complete flag of the source progress table. If the complete flag for the participant is not set and the primary replicate identifier is associated with a shadow replicate identifier, step 410 determines that the log record is to be forwarded.

In step 412, a command is issued to use the shadow replicate.

In step 414, the apply component or thread applies the log record without setting the applied-data flag. In this way, when the snooper detects the log record, the snooper will send that log record to the grouper to be replicated using the specified shadow replicate. In step 416, the flowchart exits.

If, in step 410, the apply component or thread determines that the log record should not be forwarded, in step 418, the log record is applied, and the applied-data flag is set.

After the repair target table has been repaired, normal replication for each of the participants of the replicate is restored. Normal replication is independently restored between the repair target server and each participant, thereby, typically resulting in normal replication being restored gradually between the repair target server and each participant.

The switching of replication flow from "skipping and forwarding" to "normal direct application" is performed for each of the participating nodes independently. A transactional event is contained in a log record of the log and each log record is associated with a log record number. The log position is a log record number. To switch to normal direct application, the repair target server tracks the log position of the records that were forwarded (forwarded log position) for each participant in the repair target progress table. The repair target server also tracks the log position of the replication data which was skipped for each participant. The repair target server updates the repair target progress table while repairing the repair target table. The updates to the repair target progress table are replicated to the repair source progress table.

Figure 13:
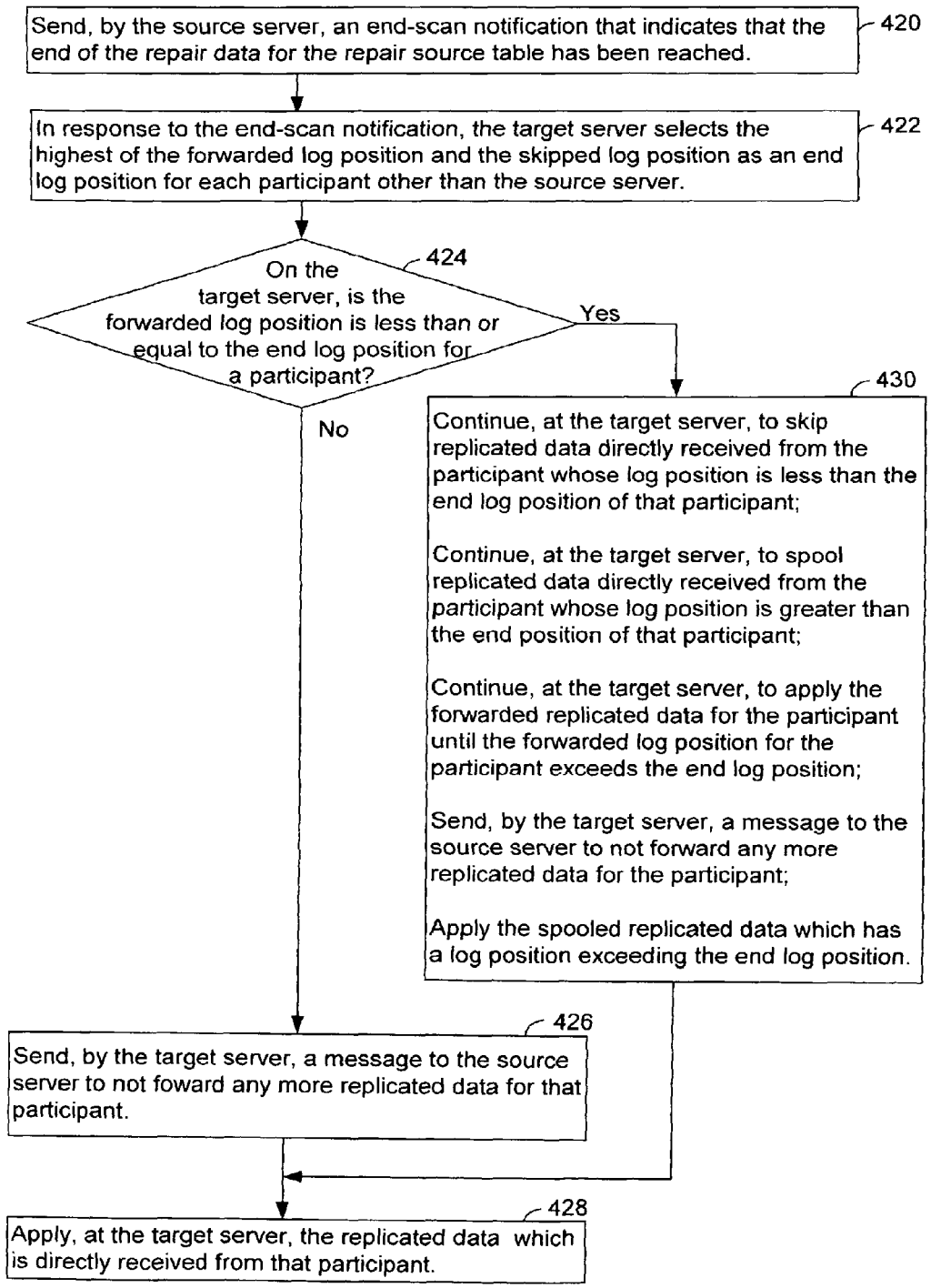
FIG. 13 depicts a flowchart of an embodiment of restoring normal replication.

FIG. 13 depicts a flowchart of an embodiment of restoring normal replication. In various embodiments, the flowchart of FIG. 13 is implemented as part of the main repair step 102 of FIG. 3.

In step 420, the repair source server sends an end-scan notification that indicates that the end of the table has been reached. The source scanner sends the end-scan notification in the block flags of the source control table.

In step 422, in response to the end-scan notification, the target analyzer on the target server selects the highest of the forwarded log position and the skipped log position as an end position for each participant other than the source server. The end position represents a point of singularity at which the target server will switch to applying replicated data directly from the server sending the replicated data, rather than applying the forwarded data from the repair source server.

In step 424, the target server determines whether the forwarded log position is less than or equal to the end log position for a participant. If not, in step 426, the target server sends a stop-forwarding message to the source server to not forward any more replicated data for that participant. In some embodiments the stop-forwarding message is sent by updating the row of the target progress table for the participant by setting the complete flag in the complete flag column. The update of the complete flag is replicated to the source progress table.

In step 428, the target server applies the replicated data which is directly received from that participant.

If, in step 424, the target server determines that the forwarded log position is less than or equal to the end log position, in step 430, the target server continues to skip replicated data directly received from the participant whose log position is less than the end log position of that participant and continues to spool replicated data directly received from the participant whose log position is greater than the end position of that participant, and continues to apply the forwarded replicated data for the participant until the forwarded log position for the participant exceeds the end log position. The target server then sends a message to the source server to not forward any more replicated data for the participant, as described above. The target server applies the spooled replicated data which has a log position exceeding the end log position. Step 430 proceeds to step 428.

Steps 424 to 430 are repeated for the remaining participants.

Table 7 below depicts an exemplary table at the target server which contains the log position of the replication data from the other participants which was skipped.

TABLE 7

Exemplary table with log position of the skipped participants

| Node | Skipped position |
| --- | --- |
| Participant 1 | 150 |
| Participant 2 | 140 |
| Participant 3 | 110 |

Table 8 below illustrates an exemplary repair progress table for a replicate. The repair progress table shown below is the repair target progress table and the repair source progress table. The repair progress table also has a node column, a forwarded position column and an end position column.

TABLE 8

Exemplary repair progress table

| Node | Forwarded position | End Position |
| --- | --- | --- |
| Participant 1 | 100 | 150 |
| Participant 2 | 140 | 140 |
| Participant 3 | 120 | 120 |

The replicate of Tables 7 and 8 has three participants other than the repair source and the repair target servers. The repair progress table is maintained at the source and target servers of the repair job. For example, for participant one, the skipped position in Table 7 is greater than the forwarded position in Table 8, therefore the end position is set to the skipped position. The source server forwards the replication data from participant one until the data reaches the end log position, 150. While receiving the forwarded replication data from participant one from the source server, any replication data that is directly received from participant one which has a log position greater than the end log position, 150, will be spooled.

For participant two, the skipped position of Table 7 is the same as the forwarded position of Table 8; therefore the end position is set to the forwarded position. Therefore, the source server does not forward the replicated data from participant two because the end position has been reached.

For participant three, the skipped position of Table 7 is less than the forwarded position of Table 8; therefore the end position is set to the forwarded position. Therefore the source server does not forward any more replicated data from participant three because the end position has been reached.

Figure 14A:
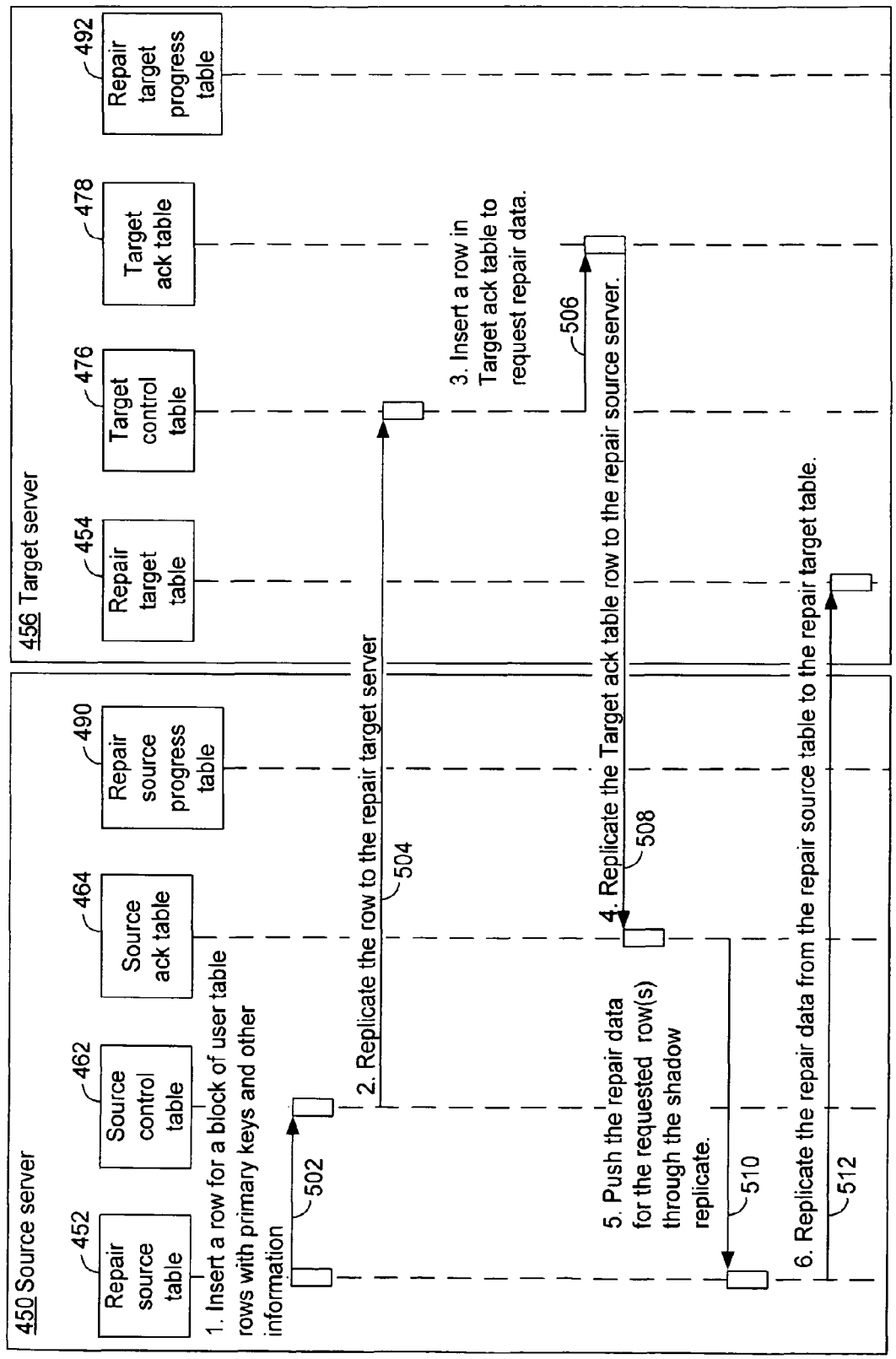
FIG. 14 comprises FIGS. 14A, 14B and 14C which collectively depict the flow of data while repairing a table.
Figure 14B:
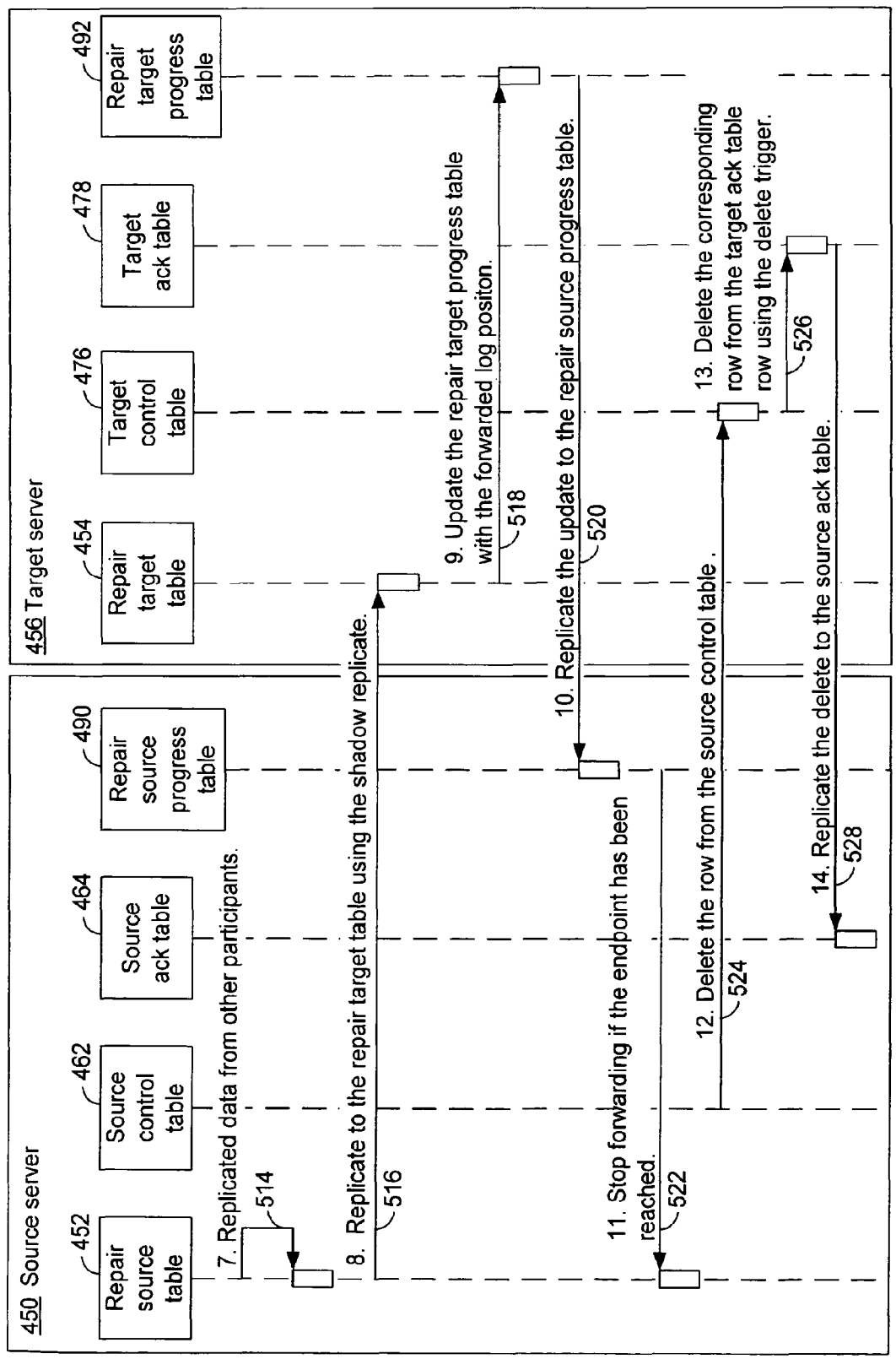
Figure 14C:
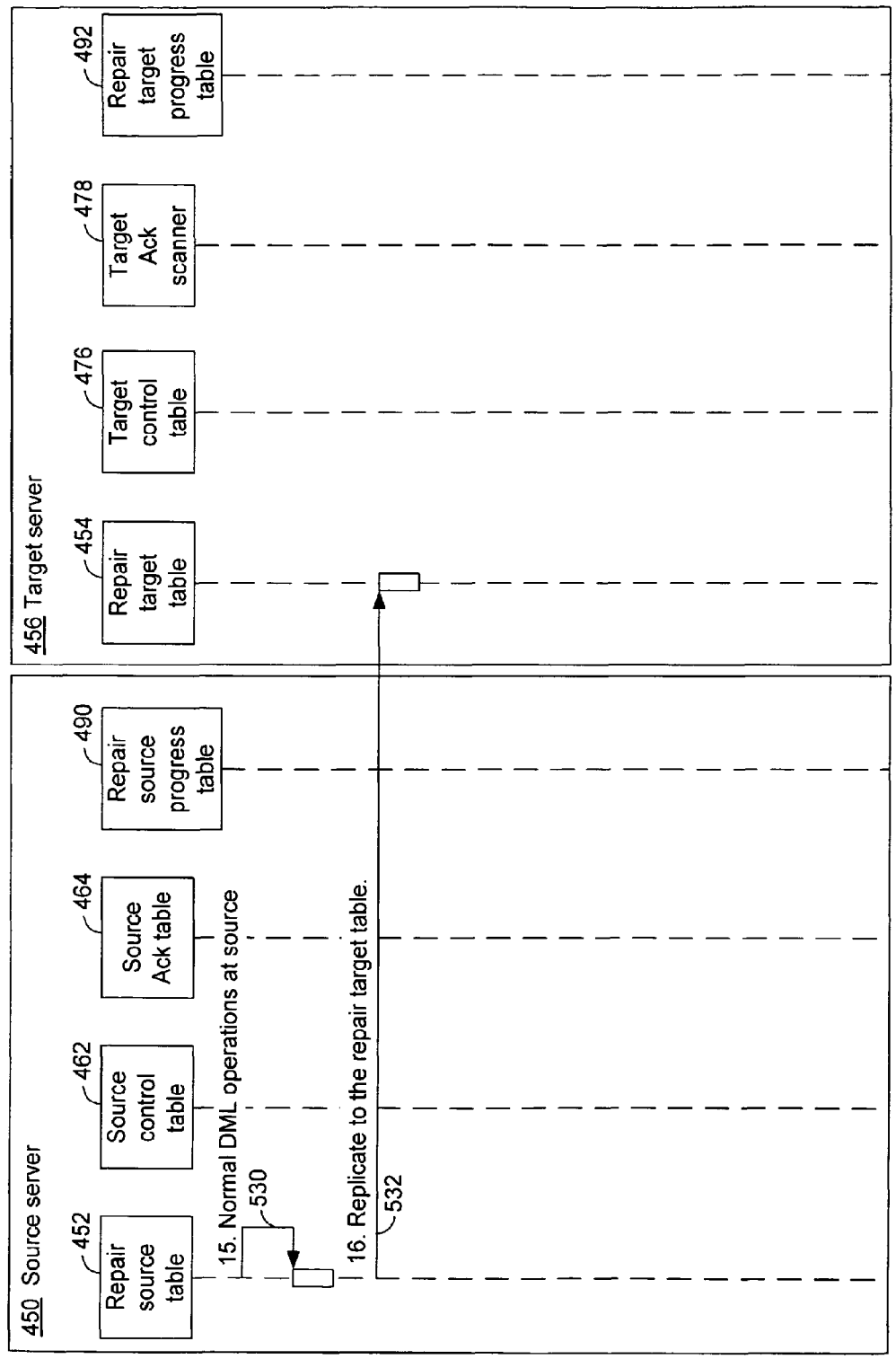

FIG. 14 comprises FIGS. 14A, 14B and 14C which collectively depict an embodiment of the flow of data while repairing a table. The source server 450 has a repair source table 452, source control table 462, source ack table 464 and repair source progress table 490. The target server 456 has a repair target table 454, target control table 476, target ack table 478 and repair target progress table 492. The flow of data between the tables will now be described. In FIG. 14A, arrows 502 to 512 are associated with the main repair step 102 of FIG. 3. In FIG. 14B, arrows 514 to 516 are associated with the forwarding step 104 of FIG. 3. Arrows 518 to 528 are associated with the clean-up step 106 of FIG. 3. In FIG. 14C, arrows 530 to 532 are associated with the on-going replication step 108 of FIG. 3.

The flow of data during the main repair step 102 of FIG. 3 will now be described. In FIG. 14A, as shown by arrow 502, the source scanner reads one or more rows from the repair source table 452 in accordance with the specified block size and inserts the primary keys of those rows, with additional information, into the source control table 462. As shown by arrow 504, the row which was inserted into the source control table 462 is replicated to the target control table 476 on the target server 456. The target analyzer is invoked and determines what action to take based on the row which was replicated to the target control table and the rows in the repair target table. The target analyzer has been described above with reference to FIGS. 5 and 7.

As indicated by arrow 506, as described above, the target analyzer inserts a row to request repair data is into the Target ack table 478.

As shown by arrow 508, the replication application replicates the row which was inserted into the target ack table 478 to the source ack table 464 using a primary replicate. In response to the replication application inserting the row into the source ack table 464, the insert trigger on the source ack table is fired which invokes the repair data producer stored procedure. As shown by arrow 510, the repair data producer pushes the repair data for the requested row(s) from the repair source table 462 to the repair target table 454 through the shadow replicate. For example, the repair data is pushed to the repair target table 454 using the dummy update statement as described above. As shown by arrow 512, the repair data is replicated from the repair source table 452 to the repair target table 454 using the shadow replicate. The apply component or thread on the target server 454 treats the primary and shadow replicates as equivalents and applies the replicated row(s) from the repair source table to the repair target table 454. In this way, rows are repaired on the repair target table 454.

The data flow of the forwarding step 104 of FIG. 3 will now be described. In FIG. 14B, arrow 514 shows that replicated rows from other participants are applied to the repair source table 452 on the repair source server 450. As shown by arrow 516, the replicated data for the repair target table from participants other than the repair source is forwarded by the source server to the target server using the shadow replicate. The apply component on the target server 456 applies the replicated data from the repair source server which were replicated using the shadow replicate. Meanwhile, the target server spools the replicated data for the repair target table which were received directly from the other participants.

As shown by arrow 518, the apply component or thread at the repair target server updates the repair target progress table 492 with the forwarded log position. As shown by arrow 520, the replication application replicates the updates to the repair target progress table 492 to the repair source progress table 490 using a primary replicate.

The clean-up step 106 of FIG. 3 will now be described. In FIG. 14B, as shown by arrow 524, after pushing a repair data to the target server using the shadow replicate, the repair data producer deletes the row associated with the request from the source control table 462.

The delete of the row from the source control table is replicated to the target control table 476 using the primary replicate. As shown by arrow 526, in response to receiving the delete, the delete trigger on the target control table is fired and the clean-up ack stored procedure is invoked. The clean-up ack stored procedure deletes the corresponding row from the target ack table 478.

As shown by arrow 528, the delete of the row from the target ack table 478 is replicated to the source ack table 464 using a primary replicate. In this way, the source and target control tables, 462 and 476, respectively, and the source and target ack tables, 464 and 478, respectively, are cleaned-up.

The on-going replication step 108 of FIG. 3 will now be described. In FIG. 14C, as shown by arrow 530, normal data manipulation language (DML) operations for the source repair table are received the source server. As shown by arrow 532, the normal data manipulation operations for the source repair table are replicated to the repair target table using the primary replicate. Therefore, replicated data from the repair source table on the primary replicate, repair data from the repair source table on the shadow replicate, and forwarded data from the other participants on the shadow replicate is typically interspersed as it is replicated to the repair target server.

In various embodiments, multiple tables may be repaired concurrently. In some embodiments, a define repair command which specifies a replicate set causes multiple repair jobs to be generated. A replicate set comprises a plurality of replicates and each replicate is associated with a table. When a replicate set is specified in the define replicate command, repair jobs are generated to repair the target tables which are associated with the replicates in the replicate set.

Figure 15:
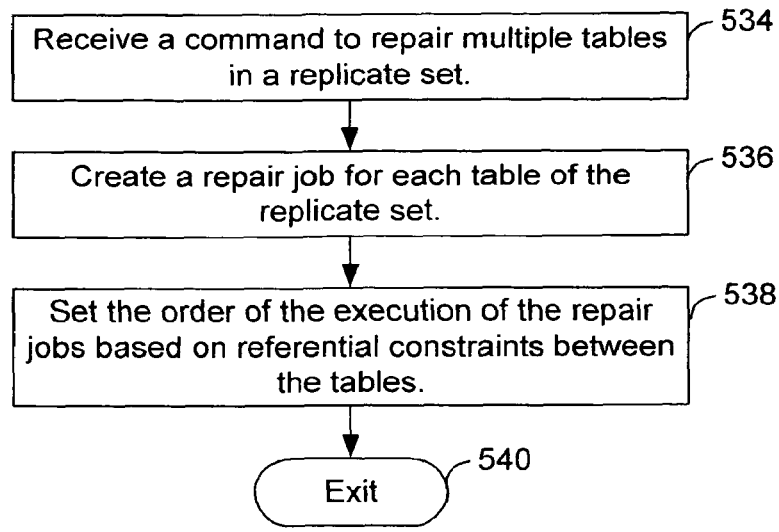
FIG. 15 depicts a flowchart of an embodiment of generating multiple repair jobs in response to a define repair command.

FIG. 15 depicts a flowchart of an embodiment of generating multiple repair jobs in response to a define repair command. In step 534, a command to repair multiple tables in a replicate set is received. In step 536, a repair job is created for each table of the replicate set. In step 538, the order of the execution of the repair jobs is set based on referential constraints between the tables. A referential constraint refers to a parent-child relationship between the tables. For example, a column of one table, called the parent table, may reference a column of another table, called the child table. The referential constraint information is stored in the local catalog of the database management system.

Figure 16:
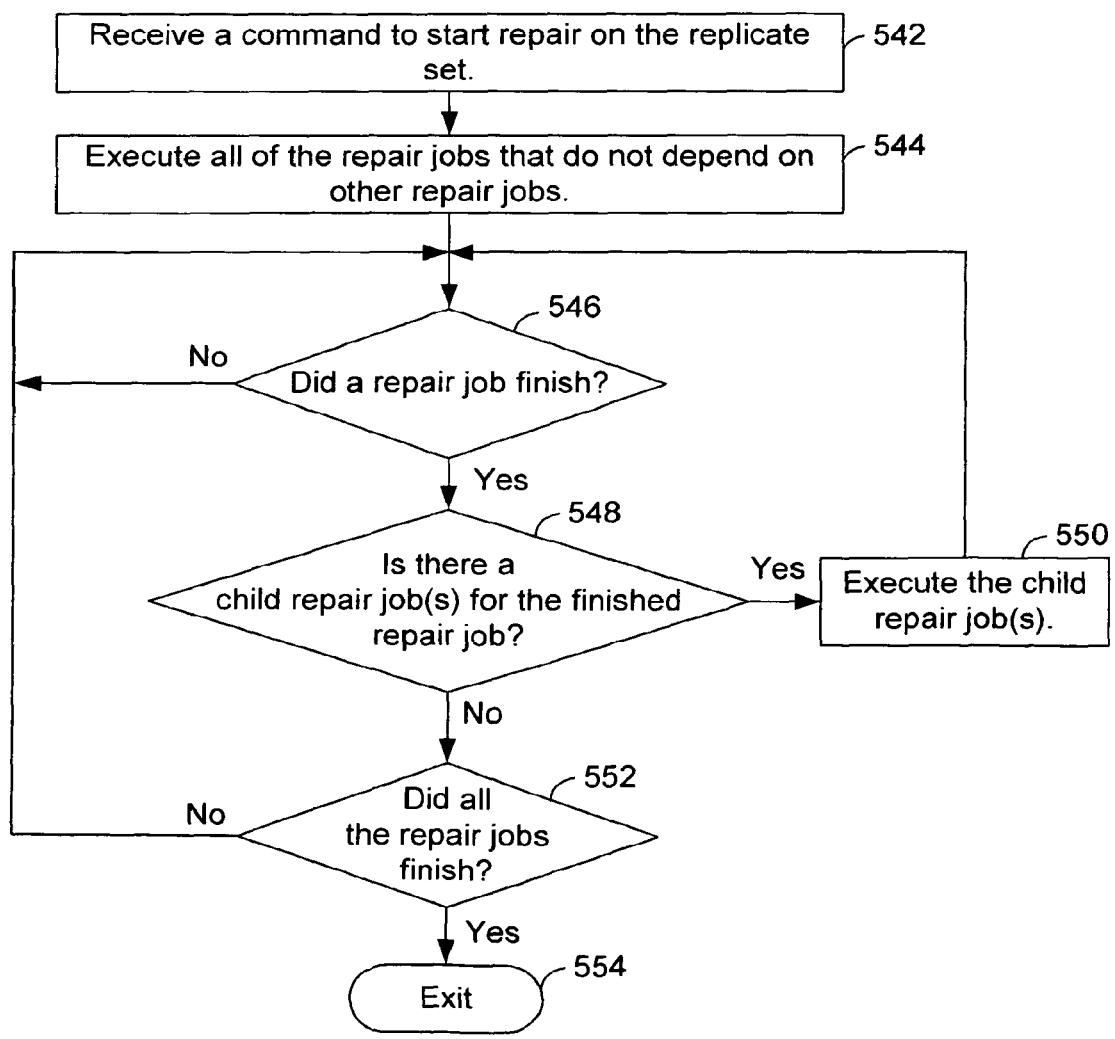
FIG. 16 depicts a flowchart of an embodiment of executing the repair jobs of FIG. 15.

FIG. 16 depicts a flowchart of an embodiment of executing the repair jobs of FIG. 15. In step 542, a command to start repair on the replicate set is received. In step 544, all the repair jobs that do not depend on other repair jobs are executed. The repair jobs that do not depend on other repair jobs were determined in step 538 of FIG. 15. A repair job does not depend on another repair job if there is no referential constraint between the tables of the repair jobs. Step 546 determines whether a repair job is finished. If not, step 546 loops back to itself to wait for a repair job to finish.

Step 548 determines whether there is a child repair job(s) for the finished repair job. If so, in step 550, the child repair job(s) are executed, and step 550 proceeds to step 546. If step 548 determines that there are no child repair job(s) for the finished repair job, step 552 determines whether all the repair jobs are finished. If not, step 552 proceeds to step 546. If step 552 determines that all the repair jobs are finished, in step 554, the flowchart exits.

Shadow Replicates

As described above, it is sometimes desirable to specifically replicate data between a single source server and a single target server within a single replicate such as when repairing a table or initially synchronizing a table of a new server to a replicate which is already active. It may also be desirable to specifically replicate data between a single source server and a plurality of, but less than all, target servers within a single replicate.

Figure 17:
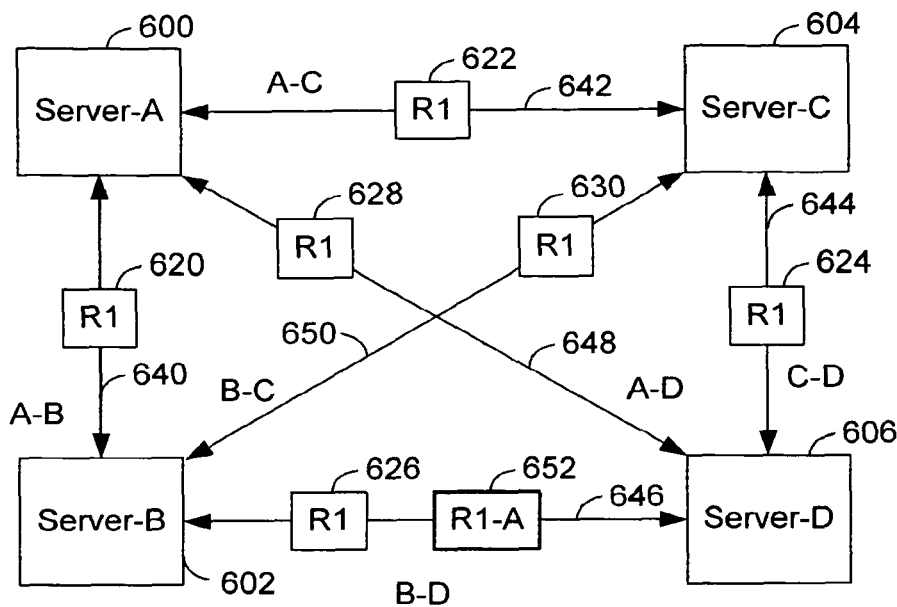
FIG. 17 depicts a diagram of servers in a replication environment.

FIG. 17 depicts a diagram of servers in a replication environment. The replication environment has three servers (Server-A, Server-B and Server-C), 600, 602 and 603, respectively and a table is being replicated among the three servers. A new server (Server-D) 606 is to be added to the replicate such that the initial resynchronization is performed online, as described above with respect to the online repair of a replicated table. Suppose that the initial synchronization is to be done from server-B 602, but it is desired that data be pulled from server-C 604 for the table on server-D, and it is also desired to merge the data from server-B 602 with the normal replicated data. Therefore, it is desirable to push synchronization data, that is, repair data, from server-B 602 to the new server-D 606 and apply that data to the table in server-B 602 in a similar manner to normal replicated data.

The existing replicate on the table is defined as R1 and is replicating on all servers. Blocks 620, 622, 624, 626, 628 and 630 are placed on arrows 640, 642, 644, 646, 648 and 650, respectively, to illustrate replicate R1 and the flow of information among the servers of the replicate. However, the table to be replicated on server-D is currently incomplete. In order to fully populate the table on server-D, the data is obtained from server-B 602. It is not desirable to propagate the data obtained from the table on server-B 602 to server-A 600 or server-C 604. To prevent the data from the table on server-B 602 from being propagated to server-A 600 and server-C 604, a new replicate, R1-A, is created between server-B 602 and server-D 606. Block 652 on arrow 646 indicates replicate R1-A. The new replicate R1-A is treated as an equivalent replicate to replicate R1. This enables the apply component or thread to perform parallelism algorithms and conflict resolution on both replicates R1 and R1-A as equivalent replicates.

As stated above, a shadow replicate is a replicate which is defined to be used in conjunction with another replicate which is referred to as a primary replicate. The shadow replicate can have some differences from the primary replicate. For instance, the shadow replicate may include different columns from the primary replicate, or may involve a subset of less than all of the servers or nodes of the primary replicate. In addition, the shadow replicate may have different conflict resolution rules from the primary replicate. Typically the source server of replication will transmit replicated data using the primary replicate. To transmit data using the shadow replicate, the shadow replicate is explicitly specified. The apply thread on the replication target server, considers the shadow and primary replicates as equivalent. There may be more than one shadow replicate for a single primary replicate.

In various embodiments, a shadow replicate is created by adding a "-mirrors=<primary_replicate>" to the define replicate command.

An embodiment of implementing the shadow replicate will now be described. A replicate definition table associates the primary and shadow replicates with each other. Typically the replicate definition table is in the global catalog and is updated when a replicate is defined. The replicate definition table comprises a primary replicate identifier (id) column and an apply identifier column, in addition to other information. A portion of a replicate definition table is shown below in Table 9.

TABLE 9

| Portion of a replicate definition table | |
| --- | --- |
| Primary replicate identifier | Apply identifier |

Each replicate is associated with one row of the replicate definition table. The primary replicate identifier identifies the replicate. If the replicate is a primary replicate, then the primary replicate identifier is set equal to zero. If the replicate is a shadow replicate then the primary replicate identifier is set to a non-zero value. The value of the primary replicate identifier is distinct for each shadow replicate.

The apply identifier, in the apply identifier column, associates one or more shadow replicates with a primary replicate. The apply identifier is common, that is, has the same value, for the primary replicate and all of the shadow replicates associated with the primary replicate.

It is desirable that the apply threads or processes apply the replicated data for different transactions in parallel. The apply threads use the apply identifier to coordinate the application of the transactional events of the transactions. The apply threads use the apply identifier to identify the replicates which are to be considered as equivalent. The replicates which have the same value in the apply identifier are considered to be equivalent. In addition, the apply threads use the apply identifier to correctly order replicated data which was received using a primary replicate and any associated shadow replicates. The apply threads provide common locking for the apply identifier in order to support parallelism and to provide proper ordering of the apply of the operations and transactional events of the transactions.

Typically the snooper and grouper threads transmit data using the primary replicate. A transaction is sent using a specified replicate which has a specified replicate identifier. The specified replicate may be a primary replicate or a shadow replicate. The apply thread coordinates the data which was transmitted using primary and shadow replicates as a single entity. To coordinate the apply of the data, the apply uses the apply identifier, rather than the replicate identifier, to manage the apply bitmap.

The apply thread retrieves the transaction events of a transaction from the queue and identifies the replicates associated with the transaction. Based on the identified replicates determines whether that transaction can be executed, that is, committed.

Figure 18:
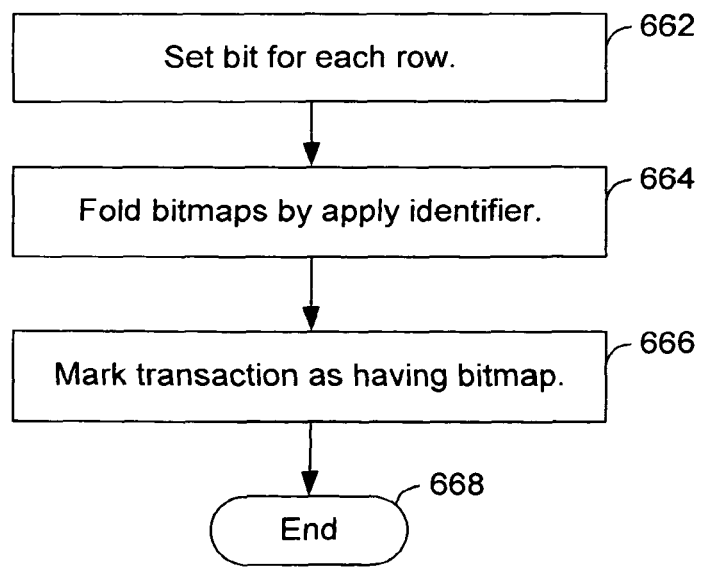
FIG. 18 depicts a flowchart of an embodiment of the processing performed by an apply thread which uses the apply identifier to identify the replicates which are associated with a transaction.

FIG. 18 depicts a flowchart of an embodiment of the processing performed by an apply thread which uses the apply identifier to identify the replicates which are associated with a transaction. A bitmap is used to identify the replicates which are associated with a transaction. Each replicate is associated with a bitmap, and each transaction is associated with a bit in the bitmap. In various embodiments, the bitmap is contained in the replicate definition table. In some embodiments, a hashed bit-map locking technique is used. A hash key provides an index to the bits of the bitmap. In step 662, the apply thread sets a bit which is associated with a current transaction that is being processed in the bitmap of each row in the replicate definition table for each replicate. Setting the bit acts a lock. In step 664, the bitmaps are folded by apply identifier to provide a folded bitmap. The folding of the bitmaps will be described in further detail below. In step 666, the transaction is marked as having a bitmap. In some embodiments, the transaction is marked as having a folded bitmap by setting a flag. In step 668, the flowchart ends.

The following pseudo-code describes the folding of bitmaps of step 664. In the pseudo-code below, the variable "A" represents the primary replicates within the current transaction, and the variable "B" represents the shadow replicates within the transaction. The pseudo-code is as follows:

```
For each replicate (A) within the current transaction
    If replicate (A) is marked as folded
        Continue
    End if
    For all remaining replicates (B) within the current transaction
        If A->apply identifier matches B->apply identifier
            Fold B->bitmap into A->bitmap
            Mark the replicate as folded
        End if
    End for
End for
```

In the pseudo-code above, if a primary replicate has already been folded, the bitmap for that replicate is not folded again. For the other replicates within the transaction, if the replicates have the same value in the apply identifier, their associated bitmaps are folded. Folding means that the information in the bitmaps for the other replicates (B) is transferred or copied to a folded bitmap which is associated with the primary replicate definition. The folded bitmap indicates which replicates are used by a transaction.

The apply thread determines if the current transaction can be executed based on the folded bitmap. The folded bitmap for the current transaction is compared to another bitmap which represents the transactions being executed. In some embodiments, the folded bitmap is logically operated into a comparable bitmap array representing the transactions currently being processed to determine if the replicated transaction can currently be executed. If a previous transaction is already using a replicate, as indicated by the locks or bits in the bitmap, the current transaction will not be executed. The current transaction will be applied after any previous transactions have released the locks, that is unset their respective bits in the bitmap, on the replicates used by the current transaction. If no previous transaction is using the replicate, the current transaction will be applied.

The apply thread typically applies transactions or operations in accordance with the commit order of the transactions or operations. In various embodiments, during pre-commit, the apply identifier is used to determine if an out-of-order commit can be issued, that is, whether a transaction can be applied out-of-order. Typically the apply thread will commit replicated transactions in the same order as the original transaction so that referential integrity can be supported. It is desirable to determine whether replicated transactions may be applied out-of-order to increase parallelism.

Figure 19:
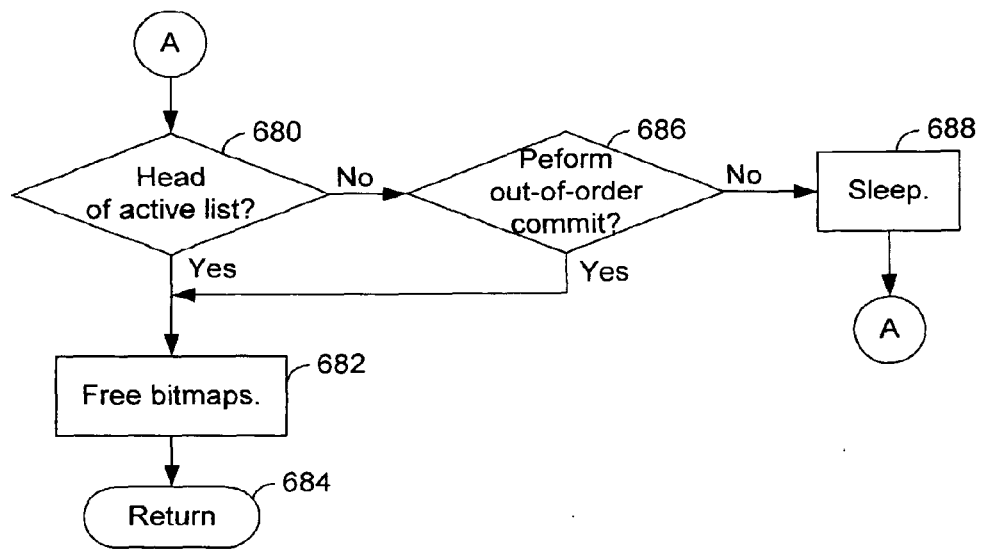
FIG. 19 depicts a flowchart of an embodiment of out-of-order pre-commit processing performed by an apply thread.

FIG. 19 depicts a flowchart of an embodiment of out-of-order pre-commit processing performed by an apply thread. Transactions being processed by an apply thread are placed on an active list. In step 680, the apply thread determines whether the current transaction is at the head of the active list. If so, in step 682, the apply thread frees the bitmaps. In other words, the bits in the bitmaps associated with the current transaction are unset. In step 684, the flowchart exits and the apply thread will process the current transaction.

If step 680 determines that the current transaction is not at the head of the active list, step 686 determines whether an out-of-order commit can be performed. If so, step 686 proceeds to step 682. If step 686 determines that an out-of-order comment cannot be performed, in step 688, the apply thread sleeps for a predetermined amount of time then proceeds to step 680.

Step 686 determines that an out-of-order commit cannot be performed if any prior transaction has a common apply identifier with any replicate within the current transaction or if any prior transaction contains any replicate with which the current transaction has referential integrity.

As described above, the capture, that is, snooper and grouper, threads typically transmit using the primary replicate. At times, it is desirable to transmit using the shadow replicate. When repairing a table, by transferring the repair data through the same conduit as is used by normal replicated data, the apply can coordinate the repair data with the normal replicated data. If the repair data were to be transferred from the source to the target outside of the transport conduit used by normal replicated data, then it would be difficult to avoid race conditions which would result in inconsistency.

In various embodiments, a command is used to specify that data be replicated using a specified shadow replicate. In some embodiments, a built-in user-defined routine to specify that data be replicated using the shadow replicate is performed by executing the procedure cdrcmd(<command_code>, <prireplid>, <shadreplid>) where the command_code is CDRCMD_USESHADOW which has a value of 1, the prireplid specifies the primary replicate identifier, and the shadreplid specifies the shadow replicate identifier. For example, the procedure is executed as follows: cdrcmd(1, 70, 81) where 70 is the replicate identifier of the primary replicate and 81 is the replicate identifier of the shadow replicate. By providing the built-in user-defined routine, the client code can force the capture, that is, the snooper and grouper, to transmit the data using the shadow replicate rather than the primary replicate.

The cdrcmd procedure places a log record into the log which will subsequently be captured by the snooper. This log record will then be used to force the grouper to use the shadow replicate (81) instead of the default primary replicate (70), but will be isolated to the transaction associated with the cdrcmd procedure.

Figure 20:
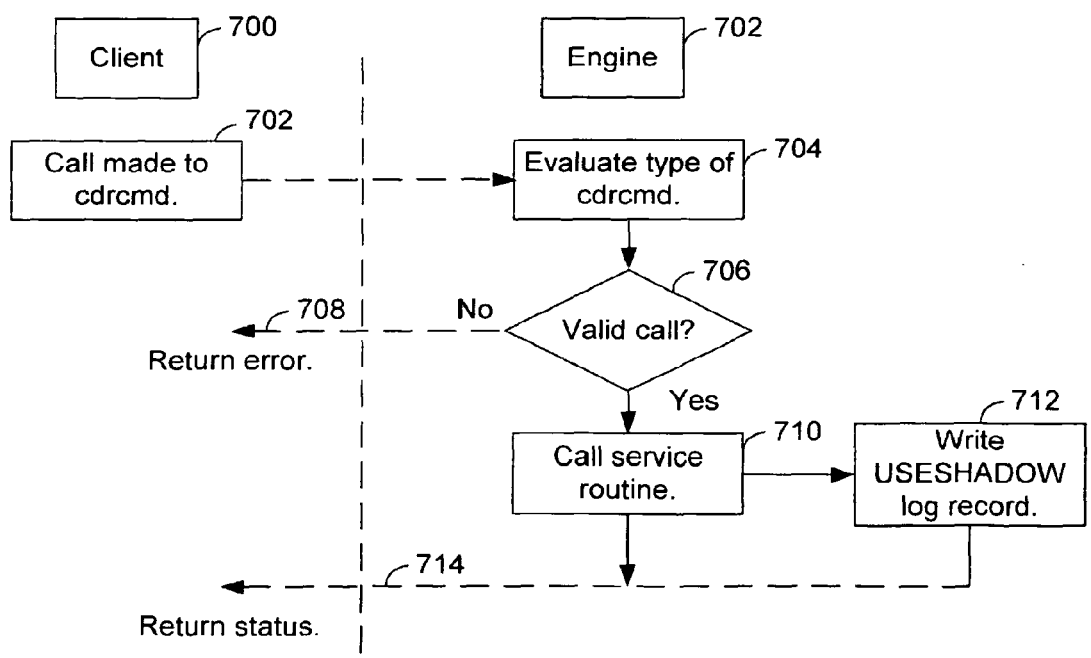
FIG. 20 depicts a flowchart of an embodiment of the processing of an exemplary command to use a shadow replicate.

FIG. 20 depicts a flowchart of an embodiment of the processing of an exemplary command to use the shadow replicate. In this example, a client application 700 makes a call to the cdrcmd procedure 702 which was described above. In the replication application, an engine 704 evaluates the type of cdrcmd procedure. Step 706 determines whether the cdrcmd is a valid call. If not, as indicated by arrow 708, an error is returned to the client. If step 706 determines that the call is valid, in step 710, the service routine is called, that is, the cdrcmd procedure is invoked. In step 712, a USESHADOW log record is written. Arrow 714 indicates that the status of the call to the service routine and the status of the write of the USESHADOW log record are returned to the client.

As log records are snooped, the snooper can detect the USESHADOW log record and will convert the USESHADOW log record into an internal format which is known by the rest of the replication application. The converted USE- SHADOW log record is then passed to the grouper which regroups the log records into transactions.

Figure 21:
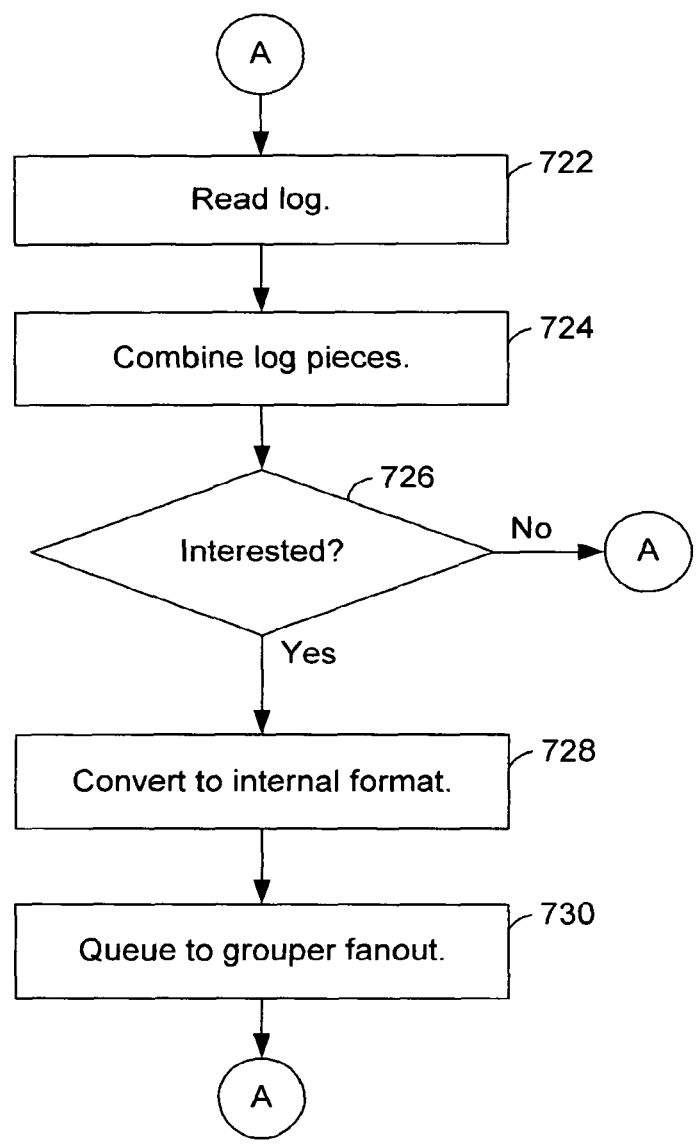
FIG. 21 depicts a flowchart of an embodiment of the architecture of the snooper of FIG. 2.

FIG. 21 depicts a flowchart of an embodiment of the snooper architecture. In step 722, the snooper reads the log. In step 724, the snooper combines the log pieces if the log record does not fit on a single page.

In step 726, the snooper determines whether the snooper is interested in the log records. For example, when the replicate is created the user may specify that replication is to be performed for certain transactional events, such as inserting a record in a table. In step 728, the snooper converts the log record(s) to an internal format used by the replication application. In step 730, the snooper passes the converted log record(s) to a queue to a grouper fanout component which places the converted log record(s) in a queue to send to the grouper.

Figure 22:
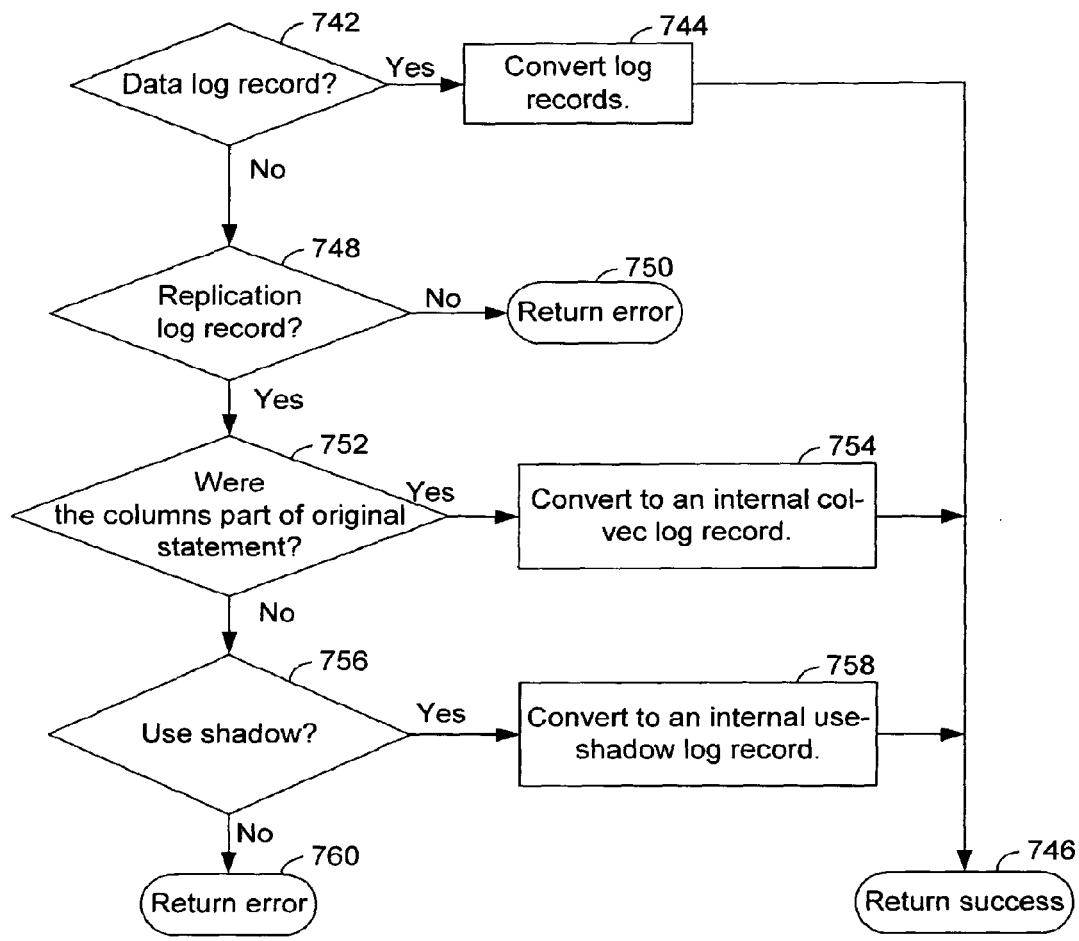
FIG. 22 depicts a flowchart of an embodiment of converting a log record into an internal format used by the replication application of FIG. 21.

FIG. 22 depicts a flowchart of an embodiment of step 728 of FIG. 21 which converts a log record into the internal format used by the replication application. In step 742, the snooper determines whether the log record is a data log record. In some embodiments, a data log record is a relational sequential access method (RSAM) log record. For example, a data log record may be for an insert, update or delete operation. If so, in step 744, the data log record is converted into the internal format used by the replication application. In step 746, success is returned.

If step 742 determines that the log record is not a data log record, step 748 determines if the log record is a replication log record. If not, in step 750, an error is returned. If step 742 determines that the log record is a data log record, in step 752, the snooper determines whether the columns of the log record were part of the original statement, that is, the SQL statement which was used to define the replicate. If so, in step 754, the log record is converted to an internal col-vec replication log record, and step 754 proceeds to step 746. The internal col-vec replication log record is a type of internal structure for the log record.

If step 754 determines that the columns of the log record were not part of the original statement, in step 756, the snooper determines whether the log record is to use the shadow replicate, that is, whether the log record is a USE_SHADOW log record. If so, in step 758, the log record is converted to an internal use-shadow replication log record. The internal use-shadow replication log record is a type of internal structure for the log record. If step 756 determines that the log record is not a use shadow replicate log record, step 756 proceeds to step 760 to return an error.

After the log snooping process has converted the use shadow log record into the internal use-shadow replication log record, the converted log record is passed to the grouper fanout thread, as are all log records which are candidates for replication. The grouper fanout thread will then convert the internal use-shadow replication log record into a grouper shadow replicate structure, called grprShadowRepl, which is attached to the transaction header of the reconstituted replicated transaction.

Figure 23:
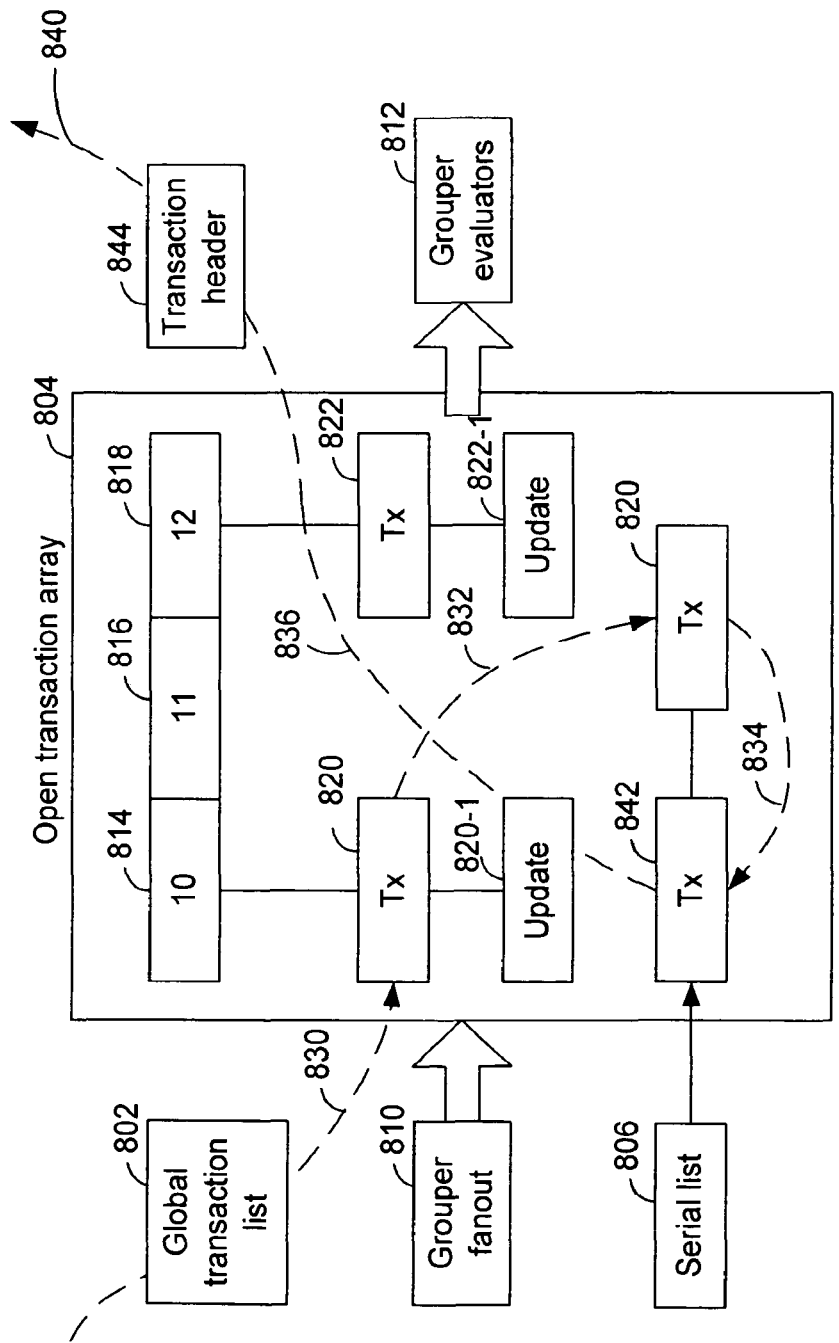
FIG. 23 depicts a diagram of an embodiment of the architecture of the grouper of FIG. 2.

FIG. 23 depicts a diagram of an embodiment of the architecture of the grouper. The global transaction list 802 is an internal structure used to keep track of transactions and is updated in response to starting a new transaction. An open transaction array 804 comprises elements, and each element is associated with a list of log records for a transaction. In response to receiving a commit for a transaction, the transaction is moved from the open transaction array 804 to the serial list 806. The serial list orders the transactions in their commit order. The grouper has a grouper fanout component 810 and a grouper evaluator component 812. The grouper fanout component 810 reconstructs transactions in the open transaction array 804. The grouper fanout component 810 receives a log record from the snooper, identifies the transaction associated with the log record and appends the log record to the tail of its associated transaction in the open transaction array. The grouper fanout component 810 also passes the reconstructed transactions to the grouper evaluator component 812. The grouper evaluator component 812 will be described in further detail below.

In this example, elements 10, 11 and 12, 814, 816 and 818, respectively, of the open transaction array 804 are shown. In element 10 of the open transaction array, a transaction 820 has an update log record 820-1. In element 12 of the open transaction array, another transaction 822 also has an update log record 822-1. As shown by arrow 830, the global transaction list 802 points to the transactions. As shown by arrow 832, in response to receiving a commit, the transaction is appended to the tail of the serial list 806. Arrows 834, 836 and 840 indicate that transactions move toward the head 842 of the serial list and to the grouper evaluators 812. The grouper fanout component 810 associates a transaction header 844 with each transaction before the transaction is passed to the grouper evaluators 812.

Figure 24:
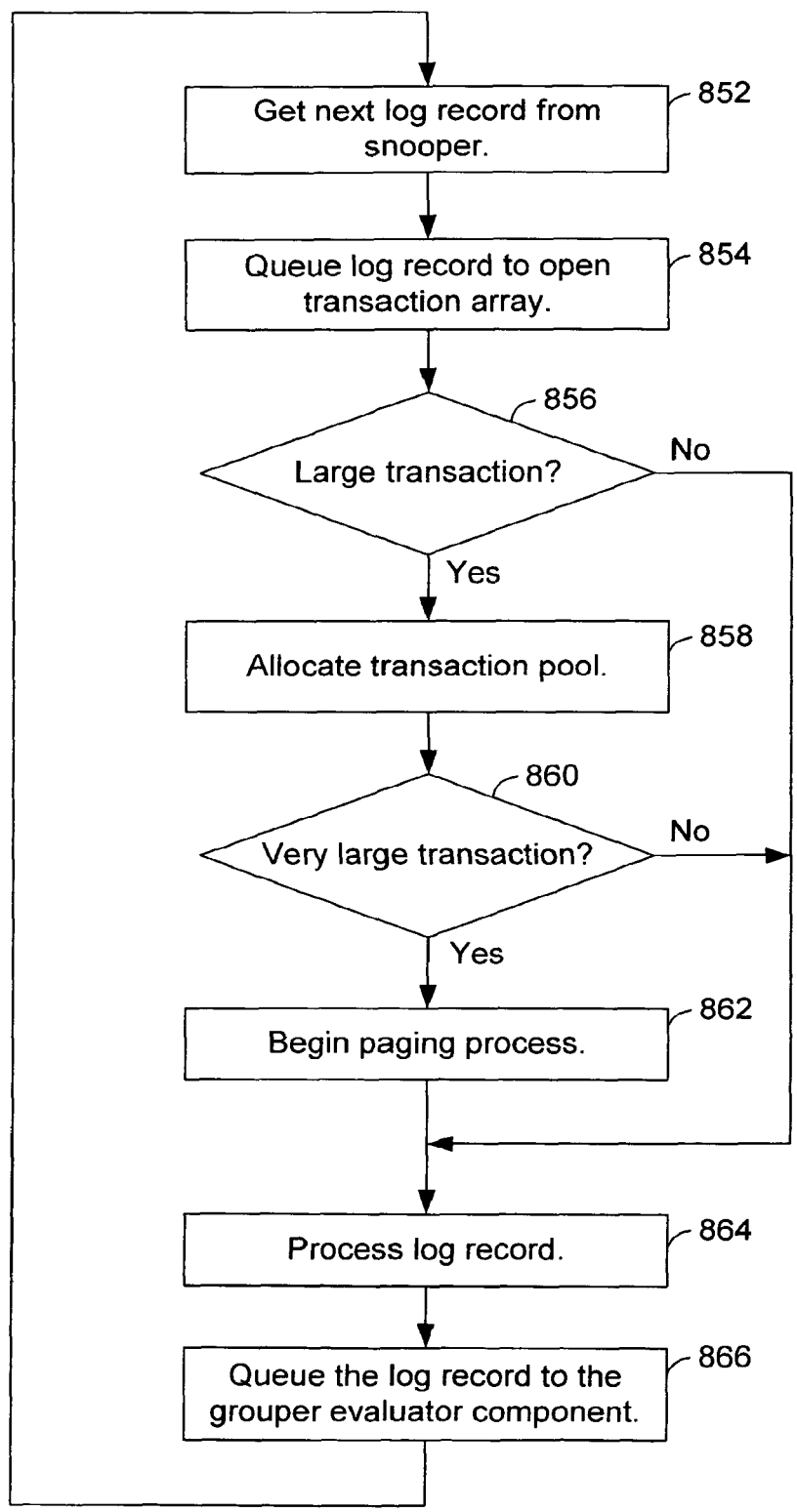
FIG. 24 depicts a flowchart of an embodiment of the grouper fanout component of FIG. 23.

FIG. 24 depicts a flowchart of an embodiment of the grouper fanout component of FIG. 23. In step 852, the grouper fanout component gets the next log record from the snooper. In step 854, the grouper queues the log record to the open transaction array. The grouper fanout component identifies the transaction associated with the log record and appends the log record to the tail of a list associated with the transaction. If a transaction is not in the open transaction array, the grouper fanout component associates an element in the open transaction array with the transaction.

Step 856 determines if a transaction is a large transaction. If so, in step 858, space is allocated in the transaction pool for the transaction. Step 860 determines if the transaction is a very large transaction. If so, in step 862, the grouper fanout component begins the paging process. In step 864, the grouper fanout component processes the log record. In step 866, the grouper fanout component queues the log record to the grouper evaluator component. Step 866 proceeds to step 852 to get another log record.

If step 856 determines that the transaction is not a large transaction, step 856 proceeds to step 864. If step 860 determines that the transaction is not a very large transaction step 860 proceeds to step 864.

Figure 25:
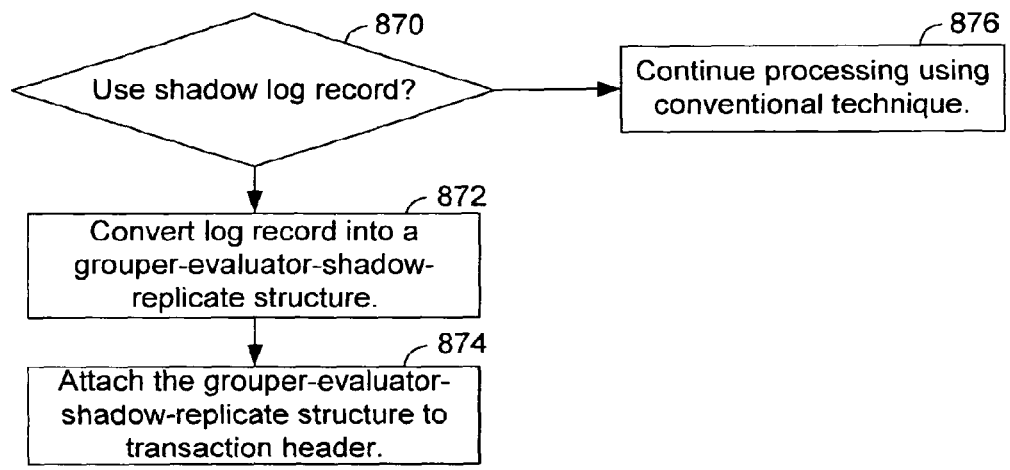
FIG. 25 depicts a flowchart of an embodiment of processing the log record of FIG. 24.

FIG. 25 depicts a flowchart of an embodiment of step 864 of FIG. 24 which processes the log record. Step 870 determines if the log record is a use shadow log record. If so, in step 872, the grouper fanout component converts the log record into a grouper-evaluator-shadow-replicate structure. In step 874, the grouper fanout component attaches the grouper-evaluator-shadow-replicate structure to the transaction header of the transaction. If step 870 determines that the log record is not a use shadow log record, in step 876, the grouper fanout component continues processing using conventional techniques.

When the reconstructed transaction has been evaluated and it is time to place the transaction into the transaction send queue, the grouper evaluator component checks to determine if the transaction should be sent as a primary or a shadow replicate.

Figure 26:
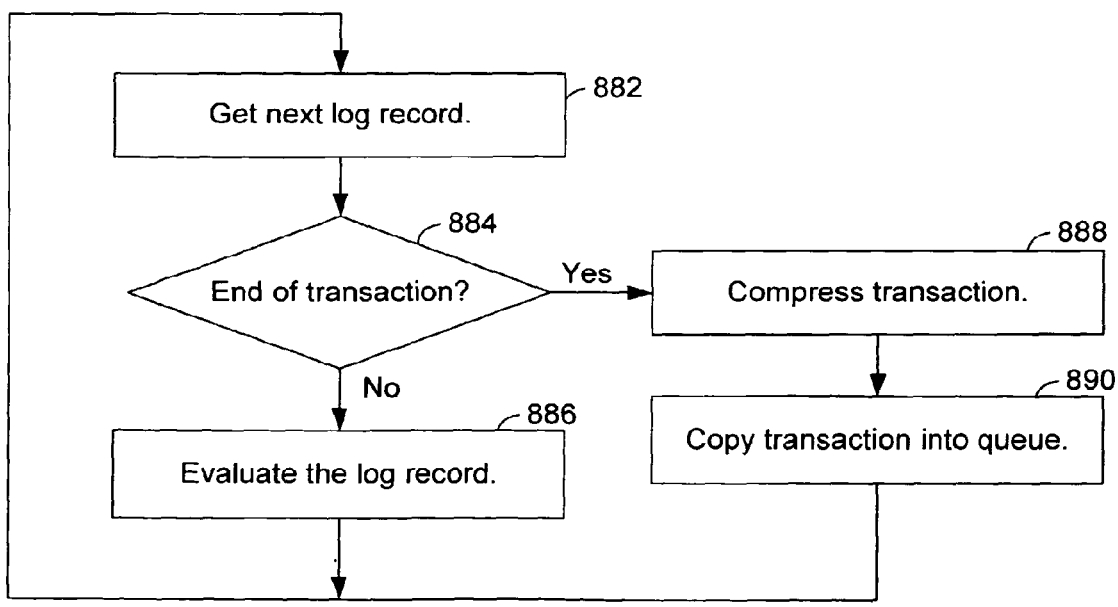
FIG. 26 depicts a flowchart of an embodiment of the grouper evaluator component of FIG. 23.

FIG. 26 depicts a flowchart of an embodiment of the grouper evaluator component. In step 882, the grouper evaluator component gets the next log record of a transaction. Step 884 determines if the end of the transaction has been reached, in other words, whether a commit was received for the transaction. If not, in step 886, the log record is evaluated. The grouper evaluator component evaluates the log record to prove that the log record is to be replicated. Step 886 proceeds to step 882 to get the next log record.

If step 884 determines that the end of the transaction has been reached, in step 888, the transaction is compressed. In step 890, the grouper evaluator component copies the transaction into the queue.

The snooper builds two lists which are passed as part of the transaction header to the grouper evaluator component. One list contains a list of shadow replicates to use, and the other list contains the list of shadow replicates to avoid. The list of shadow replicates to use is based on the shadow replicate specified as part of a command to use a shadow replicate. The list of shadow replicates to avoid are those shadow replicates that were not specified as part of the command to use the shadow replicate.

There may be multiple replicates for a single transaction. Step 890 also determines whether the log record should be sent as a primary or shadow replicate. In the pseudo-code below, the term "evaluated replicate" refers to the replicates associated with log record after the specified "where" clause of the SQL statement which was used to define the replicate has been applied to determine if the log record meets the condition for replication. The evaluated replicates associated with the log record may be a primary and shadow replicates. The following pseudo-code illustrates an embodiment of the processing performed in step 890:

```
For each log record in a transaction
    For each evaluated replicate
        If the evaluated replicate is a shadow replicate
            If the shadow replicate is not in the list to use
                Continue
            End if
        Else
            If the shadow replicate is in the list to avoid
                Continue
            End if
        End for
        <Other processing>
    End for
```

The swapping of shadow replicates will now be described. By swapping a shadow replicate, a primary replicate is replaced with a shadow replicate which is associated with that primary replicate. Therefore, the shadow replicate becomes the primary replicate and the primary replicate becomes the shadow replicate. This description will refer to the primary replicate that becomes the shadow replicate as primary->shadow (or P->S) and the shadow replicate that becomes the primary replicate as shadow->primary (or S->P).

Automatic cleanup of the P->S replicate occurs once no server is sending data using the P->S replicate. This is done by marking a point in the logical log of each server at which the log snooping will no longer use the P->S replicate. This point is referred to as the swap log position and is the current log position at the time the swap command is issued. Using the log position as a timing device provides a means of ordering operations. The swap log position is used to define which transactions will use the original replicate configuration and which will use the swapped replicate configuration.

When replication has advanced to the point that it will no longer process any log records preceding the swap log position, a shadow replicate cleanup log event is sent to notify all of the servers that log records are no longer being sent using that replicate. When a server has received such events from all of the participants of the replicate, the server knows that it will no longer be receiving data for the P->S replicate from any of the peer servers so it can remove itself as a participant of the replicate. As the last participant is removed, then the replicate itself can be removed.

To swap a shadow replicate with the primary replicate, the shadow replicate has many of the same attributes as the primary replicate such as the same participants, the same state, and the same flags as the primary replicate. However, the shadow replicate can have different columns from the primary replicate.

In various embodiments, a P->S replicate is not allowed to be promoted back to a primary replicate. In these embodiments, for a given replicate there can be only two swaps. The first swap is an S->P swap. The second swap is a P->S swap. Therefore, at most two swap log positions are maintained for any given replicate.

In response to a swap request being received on a server, the replication application marks the primary replicate as a "shadow" replicate and the shadow replicate as the primary replicate in the log. The mark in the log indicates that this is the point at which the swap becomes effective. The primary replicate name and the shadow replicate name are swapped. The primary replicate id in the replicate definition table is changed for all the existing shadow replicates for the "old" primary replicate to point to the "new" primary replicate. The swap log position is defined as being the current log position at the time the swap shadow command was issued. As data in the replicated transaction is being placed into the send queue, the replication application determines the correct replicate to use to send the replicated log record by comparing the log position of the begin work log record, that is, the start of the transaction, with any swap log position associated with the replicate.

In various embodiments, the swap log position is stably stored in the swap log position table in the global catalog. An embodiment of a swap log position table is as follows:

```
create table swaploginfo (
    repid          int,
    swap1_llid     int,
    swap1_llpos    int,
    swap2_llid     int,
    swap2_llpos    int,
) lock mode row;
```

The repid column contains the replicate identifier of the primary replicate. The columns with swap1 in their name are used to track when a replicate becomes a primary replicate and the columns with swap2 in their name are used to track when the replicate is changed back to a shadow replicate. This is used for recovery, therefore the log is marked with at what point the swap occurs. The S->P is tracked in the swap logical log name, swap1_llid, column and the swap1 log position is contained in the swap1_llid column. The P->S is tracked in the swap 2 logical log name column, swap2_llid, and the swap2 log position is contained in the swap2_llid column.

A swap operation control message is broadcast to all the nodes or participant in the replication network.

Figure 27:
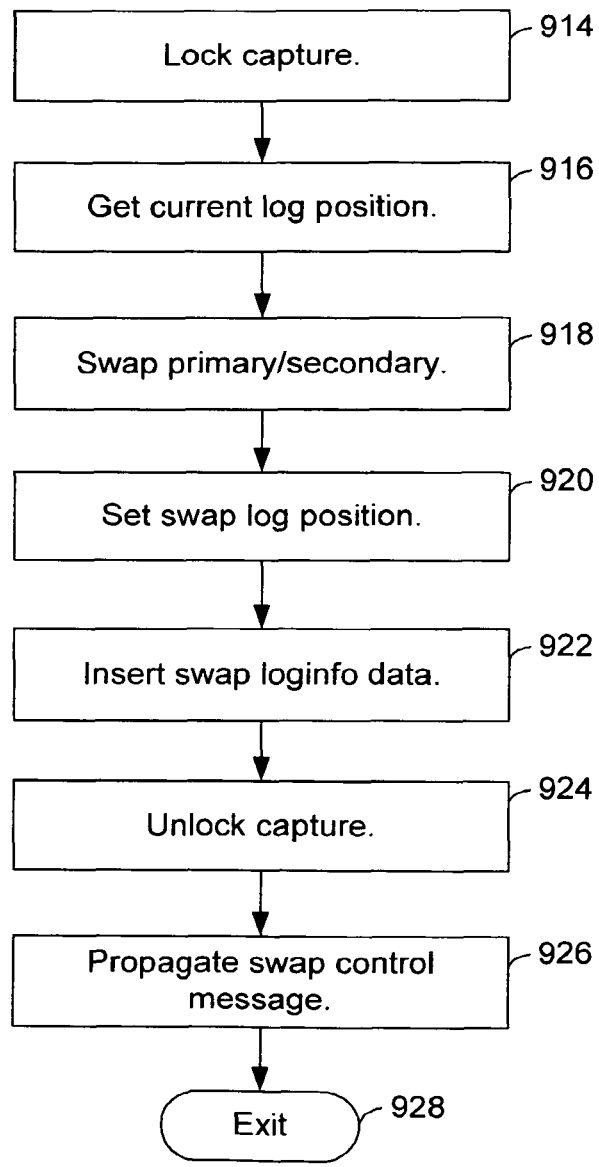
FIG. 27 depicts a flowchart of an embodiment of swapping a shadow replicate.

FIG. 27 depicts a flowchart of an embodiment of swapping a shadow replicate. The flowchart of FIG. 27 is performed by the replication application in response to a command to swap a primary and shadow replicate.

In step 914, the capture is locked, that is, the capture is paused to get the current log position as a distinct point. "Locking capture" means locking a grouper cache write lock.

Step 916 gets the current log position, that is, where the log is currently being written. In step 918, the primary and secondary replicates are swapped in the dictionary information. In step 918, the swap position is set to the current log position. The swap position is the log position at which the swap will occur. Up until this log position, the grouper will use the old primary replicate. At and after this log position, the grouper will use the new primary replicate.

In step 920, the swap log information data is inserted into the swap log position table for each replicate. The swap position is stored in swap1_llpos or swap2_llpos in the swap log position table depending on the whether the swap is P->S or S->P for the replicate.

In step 922, the capture is unlocked. "Unlocking capture" means unlocking the grouper cache write lock. In step 924, a swap control message is propagated to the other servers in the replication domain. In step 926, the flowchart exits. In response to step 924, the other servers will perform this same process of FIG. 24. The swap log position is different on every server because every server has a different log.

The grouper determines which replicate will be used to transmit the replicated data of a transaction. The grouper makes this determination while copying the transaction into the replication transmission send queue. The grouper checks the swap log info table, if any, for a replicate to determine the swap log position, and the replicate to be used is based on the swap log position.

Figure 28:
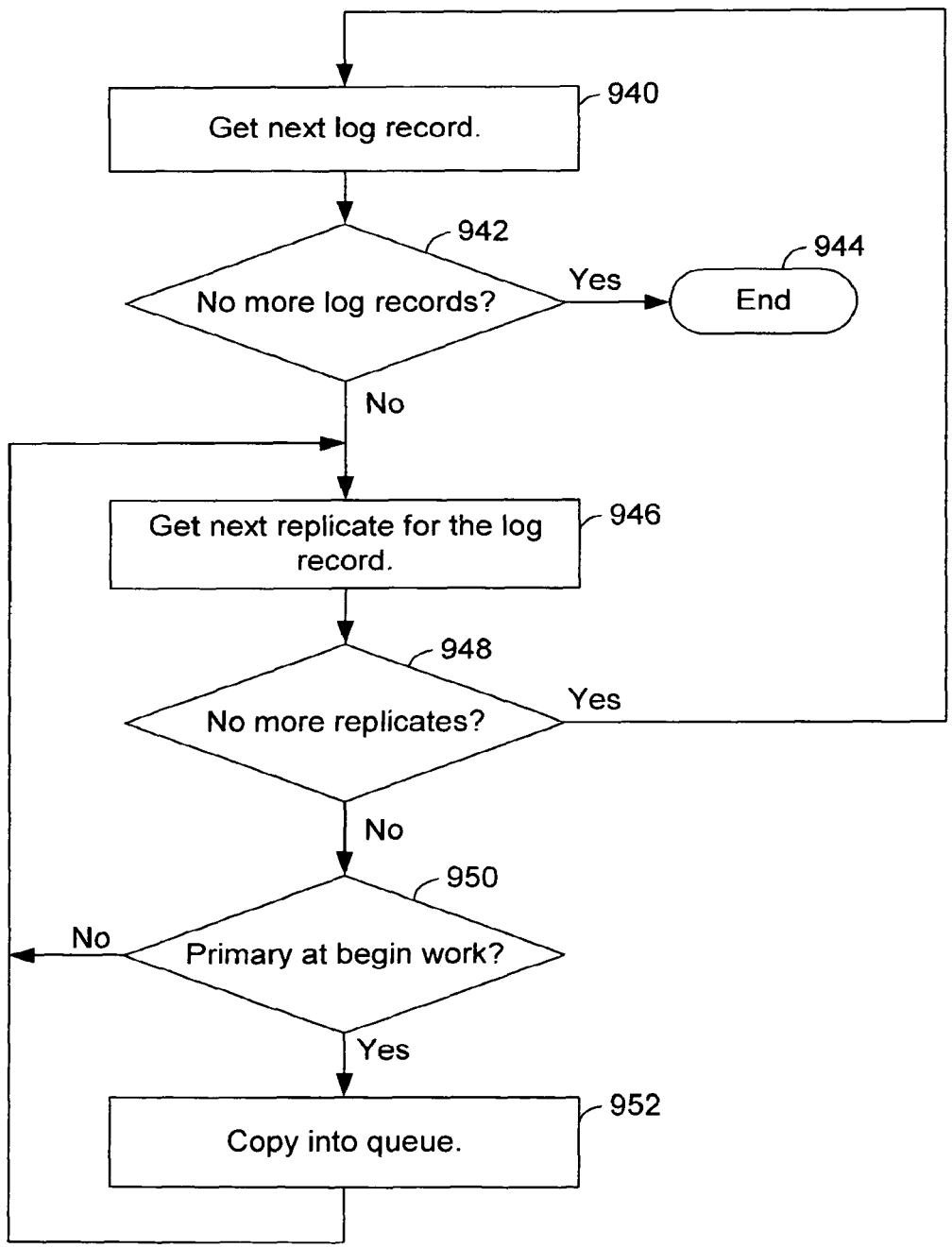
FIG. 28 depicts a flowchart of an embodiment of the grouper to determine whether to use a primary or shadow replicate.

FIG. 28 depicts a flowchart of an embodiment of the grouper to determine whether to use a primary or shadow replicate. In step 940, the grouper gets the next log record. In step 942, the grouper determines if there are no more log records. If so, in step 944, the flowchart exits. In step 946, the grouper gets the next replicate for the log record. Step 948 determines whether there are no more replicates. If so, step 948 proceeds to step 940 to get the next log record. If step 948 determines that there are more replicates, step 950 determines if the replicate was the primary replicate when the transaction began, that is, whether the replicate was the primary replicate at begin work. If not, step 950 proceeds to step 946 to get the next replicate for the log record. If so, in step 952, the log record is copied to the queue.

The clean-up after a swap will now be described. The data capture component of replication maintains a replay point which is defined to be the point at which the capture starts snooping from during recovery. The replay point is defined to be the begin work of the oldest transaction that has not yet been acknowledged by the remote servers or has not yet been placed into stable storage. By comparing the swap log position of a primary replicate that has been swapped with a shadow (P->S) replicate to the replay position, it can be determined whether it is possible that data is no longer going to be sent using the P->S replicate. Once it is determined that data is not going to be sent in the P->S replicate, the other participating nodes are notified of that fact. This notification is referred to as the shadow replicate cleanup log event, and is transmitted in the same replication conduit as normal replicated data. The shadow replicate cleanup log event is sent in the normal replication conduit because it is coordinated with replicated data for the P->S replicated data itself.

Figure 29:
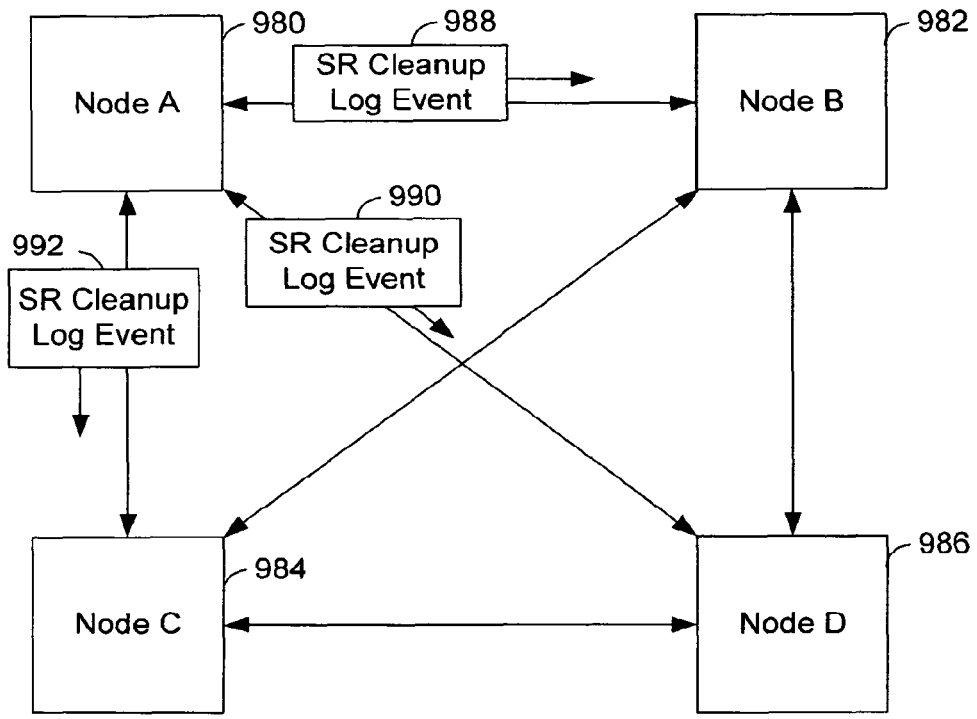
FIG. 29 depicts a diagram of four nodes of an exemplary replicate.

FIG. 29 depicts a diagram of four participants or nodes of an exemplary replicate. The replicate comprises node-A, node-B, node-C and node-D, 980, 982, 984 and 986, respectively. In response to node-A 980 determining that it has advanced the replay position past the swap log position of a swap shadow command, node-A 980 sends the shadow replicate (SR) cleanup log event 988, 990 and 992 to the peer nodes 982, 984 and 986, respectively. The shadow replicate cleanup log event is a signal that node-A 980 will no longer send any replicates in the P->S replicate.

For a participant to remove itself from the P->S replicate, that participant should receive a shadow replicate cleanup event from all the participating nodes, and that participant should have sent a shadow replicate cleanup event to all the other participating nodes and received an acknowledgement from all those other participating nodes. When a participating node of the replicate has received a shadow replicate log cleanup event from all of the peer nodes or other participants within the replicate, then that node knows that it will no longer receive any data for the P->S replicate. This means that the participant can remove itself as a member of the P->S replicate. The fact that a server has removed itself as a participant to the replicate is broadcast to the other nodes by the replication remove participant control message. When the last participant is removed from the replicate, the P->S replicate itself is removed from the replication catalog.

In various embodiments, a shadow replicate cleanup event is not expected from a read-only server. In addition, since leaf servers do not have complete catalog information, the parent server takes care of maintaining the shadow replicate cleanup event information for all its leaf servers. Whenever a leaf server sends a shadow replicate cleanup event to all the replicate participants and gets an acknowledgement for the event, it will notify its parent server to update the global catalog with shadow replicate cleanup event sent information. Also whenever a leaf server receives a shadow replicate cleanup event from a peer participant, the leaf server will notify its parent server to update the global catalog with shadow replicate cleanup event received information against a peer server identifier and shadow replicate identifier. The parent server is responsible for deleting the leaf participant from a replicate.

Figure 30:
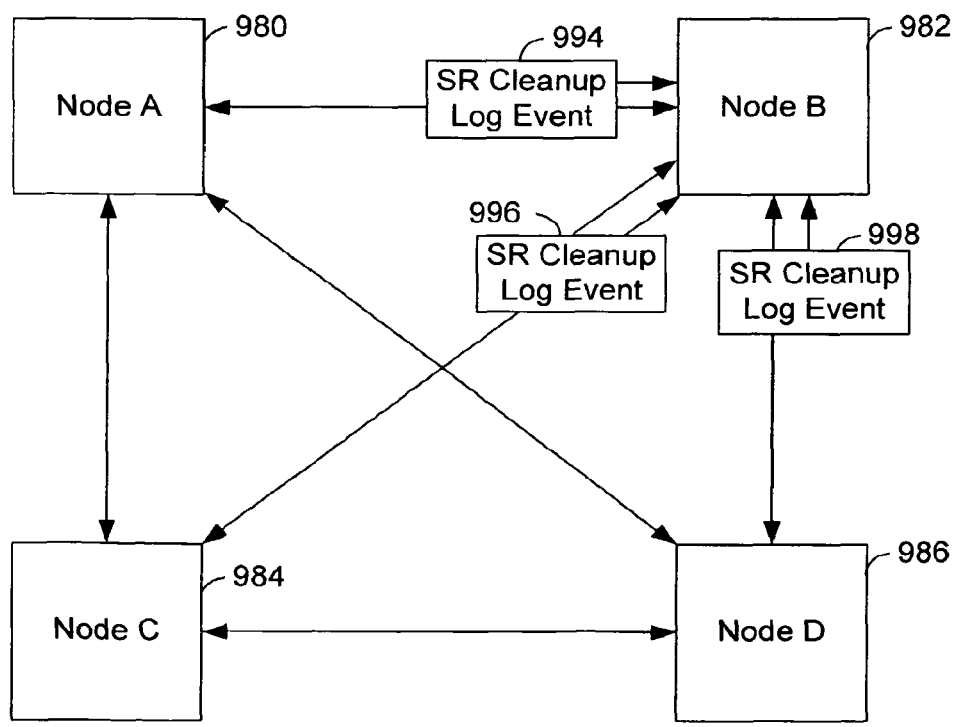
FIG. 30 depicts a diagram of the exemplary replicate of FIG. 29 in which node-A, node-C and node-D are sending a shadow replicate cleanup log event to node-B.

FIG. 30 depicts a diagram of the exemplary replicate of FIG. 29 in which node-A 980, node-C 984 and node-D 986 are sending a shadow replicate cleanup log event to node-B 982. In the following example, node-B 982 has received the shadow replicate cleanup log event, 994, 996 and 998 from all of the peer nodes, node-A 980, node-C 984 and node-D 986, respectively. In addition, node-B 982 has sent a shadow replicate cleanup log event to all the other participating nodes and received acknowledgement from all those nodes, that is, node-A 980, node-C 984 and node-D 986. Therefore, node-B 982 can remove itself as a participant within the replicate. However, the P->S replicate can not be removed until all of the nodes have removed themselves as participants of the replicate.

Various embodiments use a shadow replicate to repair a replicated table. In other embodiments, a shadow replicate is used to transition to a new schema in a replicate as described in co-pending U.S. application Ser. No. 11/060,986 entitled "Support for Schema Evolution in a Multi-Node Peer-to-Peer Replication Environment," filed concurrently herewith, by Nagaraju Inturi and Clarence Madison Pruet III.

Figure 31:
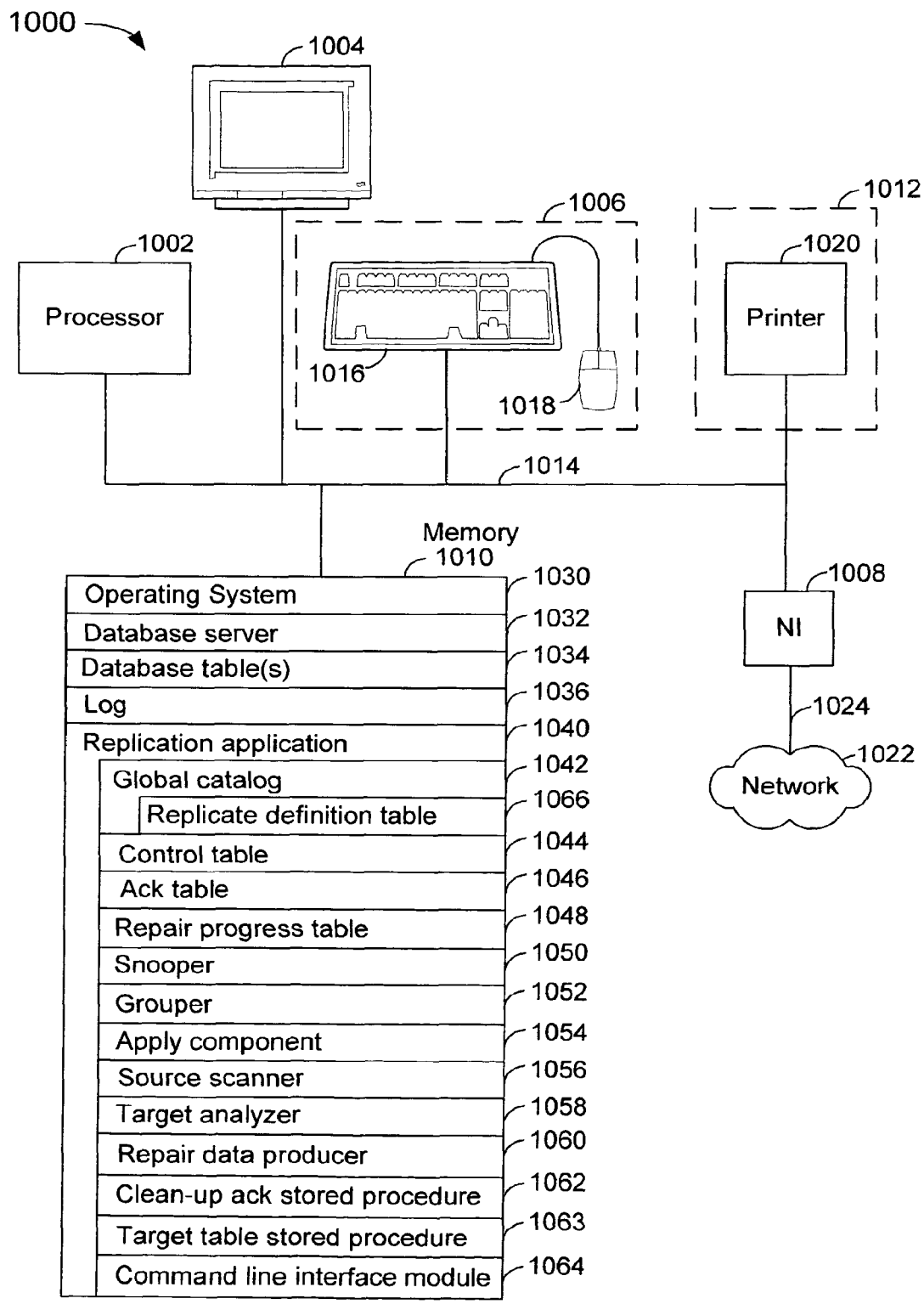
FIG. 31 depicts an illustrative computer system which uses various embodiments of the present invention.

FIG. 31 depicts an embodiment of an illustrative computer system which uses various embodiments of the present invention. The computer system 1000 comprises processor(s) 1002, display 1004, input interfaces (I/F) 1006, communications interface 1008, memory 1010 and output interface(s) 1012, all conventionally coupled by one or more buses 1014. The input interfaces 1006 comprise a keyboard 1016 and a mouse 1018. The output interface 1012 comprises a printer 1020. The communications interface 1008 is a network interface (NI) that allows the computer 1000 to communicate via a network 1022. The communications interface 1008 may be coupled to the network 1022 via a transmission medium 1024 such as a network transmission line, for example twisted pair, coaxial cable or fiber optic cable. In another embodiment, the communications interface 1008 provides a wireless interface, that is, the communications interface 1008 uses a wireless transmission medium.

The memory 1010 generally comprises different modalities, illustratively semiconductor memory, such as random access memory (RAM), and disk drives. In various embodiments, the memory 1010 stores an operating system 1030, a database server 1032, database tables 1034, a log 1036 and the replication application 1040. The replication application 1040 comprises a global catalog 1042, a control table 1044, an ack table 1046, a repair progress table, 1048, a snooper 1050, a grouper 1052, apply component 1054, source scanner 1056, target analyzer 1058, repair data producer 1060, cleanup ack stored procedure 1062, target table stored procedure 1063, and a command line interface module 1064. The control table 1044 may be a source control table or target control table depending on whether the server is a source server or target server, respectively. The ack table 1046 may be a source ack table or target ack table depending on whether the server is a source server or target server, respectively. The repair progress table 1048 may be a source repair progress table or target repair progress table depending on whether the server is a source server or target server, respectively. The global catalog 1042 comprises a replicate definition table 1066 in addition to other tables.

In various embodiments, the specific software instructions, data structures and data that implement various embodiments of the present invention are typically incorporated in the replication application 1040. Generally, an embodiment of the present invention is tangibly embodied in a computer-readable medium, for example, the memory 1010, and is comprised of instructions which, when executed by the processor 1002, cause the computer system 1000 to utilize the present invention. The memory 1010 may store the software instructions, data structures and data for any of the operating system 1030, a database server 1032, database tables 1034, log 1036 and replication application 1040 in semiconductor memory, in disk memory, or a combination thereof. Other computer memory devices presently known or that become known in the future, or combination thereof, may be used for memory 1010.

The operating system 1030 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the database server 1032 is the IBM Informix Dynamic Server. However, the invention is not meant to be limited to the IBM Informix Dynamic Server and may be used with other database management systems.

In various embodiments, the present invention may be implemented as a method, system or article of manufacture using standard programming and/or engineering techniques to produce software, firmware, hardware or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 31 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method to resynchronize replicating tables, comprising:
providing a database server as a member of a plurality of communicatively coupled database servers, wherein each database server is configured to support:
a replicating mode of operation characterized by providing access to a respective instance of a replicated table while replicating any changes to the replicated table; and
a non-replicating mode of operation characterized by providing access to the respective instance of the replicated table without replicating any changes to the replicated table; and
responsive to a request and while the plurality of database servers is operating in the replicating mode of operation and subsequent to the respective instances becoming desynchronized:
by operation of one or more computer processors, resynchronizing the respective instances of the replicated table on the database server without stopping any of the plurality of database servers and without requiring any of the plurality of database servers to operate in the non-replicating mode of operation.

2. The computer-implemented method of claim 1, wherein the respective instances become desynchronized due to an occurrence of an event comprising, in respective instances, a replication error and a replication command from a user.

3. The computer-implemented method of claim 2, wherein the plurality of database servers includes a primary database server, a secondary database server and a tertiary database server, wherein the secondary database server comprises the provided database server, wherein the secondary database server, in respective instances, disregards and defers replicating any changes that are received from the tertiary database during the resynchronization, wherein the respective instances of the replicated table are resynchronized based on a commit order of a plurality of transactions on the primary database server, wherein the plurality of transactions include replication transactions, resynchronization transactions, and forwarded transactions.

4. The computer-implemented method of claim 3, wherein each change is selectively disregarded or deferred based on a log position associated with the respective change, wherein the replication transactions include changes to the replicated table that originate from the primary database server and that are to be replicated on the secondary database server, wherein the resynchronization transactions include changes to resynchronize the instance of the replicated table on the secondary database server, and wherein the forwarded transactions include changes to the replicated table that originate from the tertiary database server and that are forwarded by the primary database server to be replicated at the secondary database server.

5. The computer-implemented method of claim 4, wherein the secondary database server comprises the provided database server, wherein the request specifies a source table, a target table, and an extra-rows indication, wherein the source table comprises the instance of the replicated table on the primary database server, wherein the target table comprises the instance of the replicated table on the secondary database server, and wherein the extra-rows indication specifies that any row that is in the target table and that is not in the source table is to be inserted into the source table.

6. The computer-implemented method of claim 5, wherein resynchronizing the respective instance of the replicated table comprises:
identifying, by the secondary database server, a first row of the target table to be resynchronized based on the target table and data of the source table;
determining, by the secondary database server, that the target table comprises a second row that is not in the source table;
processing the second row in accordance with the extra-rows indication, wherein the processing sends the second row to the primary database server, and wherein the second row is inserted into the source table;
subsequent to the first row of the target table being identified, generating, at the secondary database server, a request for repair data to resynchronize the first row of the target table; and
sending the request to the primary database server.

7. The computer-implemented method of claim 6, wherein resynchronizing the respective instance of the replicated table further comprises:
receiving, from the primary database server and by the secondary database server: (i) at least a portion of replication data, the replication data representing the changes to the replicated table and (ii) the repair data, the at least a portion of the replication data and the repair data being sent by the primary database server to the secondary database server responsive to the request being received by primary database server; and
applying the repair data and the at least a portion of the replication data to the target table.

8. A computer program product to resynchronize replicating tables, comprising:
a computer-readable storage medium having computer-readable program code embodied therewith, the computer-readable program code executable by one or more computer processors to:
provide a database server as a member of a plurality of communicatively coupled database servers, wherein each database server is configured to support: (i) a replicating mode of operation characterized by providing access to a respective instance of a replicated table while replicating any changes to the replicated table and (ii) a non-replicating mode of operation characterized by providing access to the respective instance of the replicated table without replicating any changes to the replicated table; and
responsive to a request and while the plurality of database servers is operating in the replicating mode of operation and subsequent to the respective instances becoming desynchronized, resynchronize the respective instances of the replicated table on the database server, without stopping any of the plurality of database servers and without requiring any of the plurality of database servers to operate in the non-replicating mode of operation.

9. The computer program product of claim 8, wherein the respective instances become desynchronized due to an occurrence of an event comprising, in respective instances, a replication error and a replication command from a user.

10. The computer program product of claim 9, wherein the plurality of database servers includes a primary database server, a secondary database server and a tertiary database server, wherein the secondary database server comprises the provided database server, wherein the secondary database server, in respective instances, disregards and defers replicating any changes that are received from the tertiary database during the resynchronization, wherein the respective instances of the replicated table are resynchronized based on a commit order of a plurality of transactions on the primary database server, wherein the plurality of transactions include replication transactions, resynchronization transactions, and forwarded transactions.

11. The computer program product of claim 10, wherein each change is selectively disregarded or deferred based on a log position associated with the respective change, wherein the replication transactions include changes to the replicated table that originate from the primary database server and that are to be replicated on the secondary database server, wherein the resynchronization transactions include changes to resynchronize the instance of the replicated table on the secondary database server, and wherein the forwarded transactions include changes to the replicated table that originate from the tertiary database server and that are forwarded by the primary database server to be replicated at the secondary database server.

12. The computer program product of claim 11, wherein the secondary database server comprises the provided database server, wherein the request specifies a source table, a target table, and an extra-rows indication, wherein the source table comprises the instance of the replicated table on the primary database server, wherein the target table comprises the instance of the replicated table on the secondary database server, and wherein the extra-rows indication specifies that any row that is in the target table and that is not in the source table is to be inserted into the source table.

13. The computer program product of claim 12, wherein resynchroniziinq the respective instance of the replicated table comprises:
identifying, by the secondary database server, a first row of the target table to be resynchronized based on the target table and data of the source table;
determining, by the secondary database server, that the target table comprises a second row that is not in the source table;
processing the second row in accordance with the extra-rows indication, wherein the processing sends the second row to the primary database server, and wherein the second row is inserted into the source table;
generating, at the secondary database server and subsequent to the first row of the target table being identified, a request for repair data to resynchronize the first row of the target table; and
sending the request to the primary database server.

14. The computer program product of claim 13, wherein resynchronizing the respective instance of the replicated table further comprises:
receiving, from the primary database server and by the secondary database server: (i) at least a portion of replication data, the replication data representing the changes to the replicated table and (ii) the repair data, the at least a portion of the replication data and the repair data being sent by the primary database server to the secondary database server responsive to the request being received by primary database server; and applying the repair data and the at least a portion of the replication data to the target table.

15. A system to resynchronize replicating tables, comprising:

one or more computer processors;

a memory containing a program which, when executed by the one or more computer processors, performs an operation comprising:

providing a database server as a member of a plurality of communicatively coupled database servers, wherein each database server is configured to support: (i) a replicating mode of operation characterized by providing access to a respective instance of a replicated table while replicating any changes to the replicated table and (ii) a non-replicating mode of operation characterized by providing access to the respective instance of the replicated table without replicating any changes to the replicated table; and responsive to a request and while the plurality of database servers is operating in the replicating mode of operation and subsequent to the respective instances becoming desynchronized, resynchronizing the respective instances of the replicated table on the database server, without stopping any of the plurality of database servers and without requiring any of the plurality of database servers to operate in the non-replicating mode of operation.

16. The system of claim 15, wherein the respective instances become desynchronized due to an occurrence of an event comprising, in respective instances, a replication error and a replication command from a user.

17. The system of claim 16, wherein the plurality of database servers includes a primary database server, a secondary database server and a tertiary database server, wherein the secondary database server comprises the provided database server, wherein the secondary database server, in respective instances, disregards and defers replicating any changes that are received from the tertiary database during the resynchronization, wherein the respective instances of the replicated table are resynchronized based on a commit order of a plurality of transactions on the primary database server, wherein the plurality of transactions include replication transactions, resynchronization transactions, and forwarded transactions.

18. The system of claim 17, wherein each change is selectively disregarded or deferred based on a log position associated with the respective change, wherein the replication transactions include changes to the replicated table that originate from the primary database server and that are to be replicated on the secondary database server, wherein the resynchronization transactions include changes to resynchronize the instance of the replicated table on the secondary database server, and wherein the forwarded transactions include changes to the replicated table that originate from the tertiary database server and that are forwarded by the primary database server to be replicated at the secondary database server.

19. The system of claim 18, wherein the secondary database server comprises the provided database server, wherein the request specifies a source table, a target table, and an extra-rows indication, wherein the source table comprises the instance of the replicated table on the primary database server, wherein the target table comprises the instance of the replicated table on the secondary database server, and wherein the extra-rows indication specifies that any row that is in the target table and that is not in the source table is to be inserted into the source table.

20. The system of claim 19, wherein resynchronizing the respective instance of the replicated table comprises:

identifying, by the secondary database server, a first row of the target table to be resynchronized based on the target table and data of the source table;

determining, by the secondary database server, that the target table comprises a second row that is not in the source table;

processing the second row in accordance with the extra-rows indication, wherein the processing sends the second row to the primary database server, and wherein the second row is inserted into the source table;

subsequent to the first row of the target table being identified, generating, at the secondary database server, a request for repair data to resynchronize the first row of the target table;

sending the request to the primary database server;

receiving, from the primary database server and by the secondary database server: (i) at least a portion of replication data, the replication data representing the changes to the replicated table and (ii) the repair data, the at least a portion of the replication data and the repair data being sent by the primary database server to the secondary database server responsive to the request being received by primary database server; and applying the repair data and the at least a portion of the replication data to the target table.

* * * * *